(12) United States Patent
Barrameda et al.

(10) Patent No.: US 11,949,784 B2
(45) Date of Patent: *Apr. 2, 2024

(54) AUDITING FOR EVENTS

(71) Applicant: Ridgeline, Inc., Incline Village, NV (US)

(72) Inventors: George Michael Barrameda, Brooklyn, NY (US); Joan Hyewon Hong, Incline Village, NV (US); Hayden Ray Hudgins, Incline Village, NV (US); Nathan Matthew Macfarlane, Incline Village, NV (US)

(73) Assignee: Ridgeline, Inc., Incline Village, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/931,201

(22) Filed: May 13, 2020

(65) Prior Publication Data

US 2021/0359852 A1 Nov. 18, 2021

(51) Int. Cl.
*H04L 9/08* (2006.01)
*H04L 9/06* (2006.01)
(Continued)

(52) U.S. Cl.
CPC .......... *H04L 9/0861* (2013.01); *H04L 9/0643* (2013.01); *H04L 9/0825* (2013.01);
(Continued)

(58) Field of Classification Search
CPC ... H04L 9/0861; H04L 9/0643; H04L 9/0825; H04L 9/3247; H04L 9/3239;
(Continued)

(56) References Cited

U.S. PATENT DOCUMENTS 5,956,404 A * 9/1999 Schneier ............... H04L 9/3297
380/30
6,738,737 B1 5/2004 Carter
(Continued)

FOREIGN PATENT DOCUMENTS

CN 103902925 A * 7/2014 ............. G06F 21/64
CN 102096848 11/2015
(Continued)

OTHER PUBLICATIONS

Blockchain Enabled Privacy Audit Logs by Andrew Sutton and Reza Samavi (Department of Computing and Software, McMaster University, Hamilton, ON Canada) pp. 16; Springer International Publishing AG (Year: 2017).*

(Continued)

*Primary Examiner* — Eleni A Shiferaw
*Assistant Examiner* — Ali H. Cheema
(74) *Attorney, Agent, or Firm* — Van Pelt, Yi & James LLP

(57) ABSTRACT

A system for auditing event data includes an interface and a processor. The interface is configured to receive an audit query request and a client key. The processor is configured to determine whether the audit query request is valid; determine whether a chain of events is stored in an audit store, wherein the chain of events is associated with the audit query request; and in response to determining that the chain of events is stored in the audit store, provide data for the audit query request.

6 Claims, 22 Drawing Sheets

(51) Int. Cl.
*H04L 9/32* (2006.01)
*H04L 41/0604* (2022.01)
*H04L 9/00* (2022.01)

(52) U.S. Cl.
CPC ........ *H04L 9/3247* (2013.01); *H04L 41/0627* (2013.01); *H04L 9/3239* (2013.01); *H04L 9/3255* (2013.01); *H04L 9/50* (2022.05)

(58) Field of Classification Search
CPC ............. H04L 2209/38; H04L 63/0227; H04L 63/0428; H04L 63/12; H04L 63/20; H04L 63/102; H04L 41/0627; G06F 21/10; G06F 21/604; G06F 21/6218
USPC ...................................... 380/44, 30; 713/176
See application file for complete search history.

(56) References Cited

U.S. PATENT DOCUMENTS

| | | | |
|---|---|---|---|
| 8,332,349 | B1 | 12/2012 | Wilson |
| 8,566,341 | B2 | 10/2013 | Oliver |
| 8,943,332 | B2* | 1/2015 | Horne ...................... G06F 21/33 707/648 |
| 9,654,510 | B1* | 5/2017 | Pillai ....................... H04L 63/20 |
| 10,135,862 | B1 | 11/2018 | McClintock |
| 10,261,846 | B1* | 4/2019 | Patton ..................... G06F 9/542 |
| 10,554,649 | B1 | 2/2020 | Fields |
| 10,831,877 | B1* | 11/2020 | Al-Gharaibeh ......... G06F 21/31 |
| 10,887,081 | B2* | 1/2021 | Oberhofer ........... H04L 63/1425 |
| 11,025,409 | B1 | 6/2021 | Fields |
| 11,057,187 | B2* | 7/2021 | Buldas ................. H04L 9/3247 |
| 11,637,691 | B2* | 4/2023 | Venkataramappa .... G06F 16/27 713/171 |
| 2004/0006692 | A1 | 1/2004 | Honda |
| 2004/0098352 | A1 | 5/2004 | Matsuyama |
| 2007/0265946 | A1 | 11/2007 | Schimpf |
| 2008/0069347 | A1 | 3/2008 | Brown |
| 2008/0082585 | A1 | 4/2008 | Elgezabal |
| 2008/0301124 | A1 | 12/2008 | Alves |
| 2009/0089592 | A1* | 4/2009 | Kudo .................... H04L 9/3297 713/193 |
| 2010/0077222 | A1 | 3/2010 | Scherzer |
| 2010/0313277 | A1* | 12/2010 | Pepin ..................... G06F 21/77 726/30 |
| 2011/0083064 | A1 | 4/2011 | Kagan |
| 2012/0023200 | A1 | 1/2012 | Johnson |
| 2012/0023221 | A1* | 1/2012 | Dayan ................. G06F 11/3055 709/224 |
| 2012/0311696 | A1 | 12/2012 | Datsenko |
| 2013/0145166 | A1* | 6/2013 | Hsien ................... H04L 9/3226 713/176 |
| 2013/0198522 | A1 | 8/2013 | Kohno |
| 2013/0239230 | A1 | 9/2013 | Herbach |
| 2014/0325238 | A1 | 10/2014 | Ghose |
| 2015/0188715 | A1 | 7/2015 | Castellucci |
| 2015/0256344 | A1* | 9/2015 | Minamimoto ........ H04L 9/3242 713/176 |
| 2015/0341176 | A1* | 11/2015 | Staykov ............... H04L 9/3247 713/176 |
| 2016/0171205 | A1 | 6/2016 | Bauer |
| 2016/0254906 | A1 | 9/2016 | Castellucci |
| 2016/0330027 | A1 | 11/2016 | Ebrahimi |
| 2016/0379013 | A1* | 12/2016 | Ganesan .............. H04L 63/0823 713/176 |
| 2017/0024322 | A1* | 1/2017 | Pan ..................... G06F 12/0868 |
| 2017/0033932 | A1 | 2/2017 | Truu |
| 2017/0046638 | A1 | 2/2017 | Chan |
| 2017/0046651 | A1 | 2/2017 | Lin |
| 2017/0177446 | A1 | 6/2017 | Maclean |
| 2017/0221052 | A1* | 8/2017 | Sheng ...................... H04L 9/14 |
| 2017/0236121 | A1 | 8/2017 | Lyons |
| 2017/0257358 | A1* | 9/2017 | Ebrahimi ............ H04L 63/0861 |
| 2018/0060596 | A1* | 3/2018 | Hamel .................... G06F 21/62 |
| 2018/0060600 | A1* | 3/2018 | Hamel .................... H04L 9/088 |
| 2018/0062835 | A1* | 3/2018 | Hamel .................. H04L 9/0894 |
| 2018/0076957 | A1 | 3/2018 | Watanabe |
| 2018/0091524 | A1* | 3/2018 | Setty .................... H04L 9/3247 |
| 2018/0117446 | A1* | 5/2018 | Tran ...................... A42B 3/0433 |
| 2018/0117447 | A1* | 5/2018 | Tran ...................... G06Q 20/382 |
| 2018/0173747 | A1 | 6/2018 | Baird, III |
| 2018/0189312 | A1* | 7/2018 | Alas ......................... G06F 21/64 |
| 2018/0198604 | A1* | 7/2018 | Hayton .................. H04W 12/10 |
| 2018/0276270 | A1* | 9/2018 | Bisbee .............. G06Q 30/0241 |
| 2018/0331835 | A1 | 11/2018 | Jackson |
| 2018/0357267 | A1 | 12/2018 | Zenger |
| 2019/0036906 | A1 | 1/2019 | Biyani |
| 2019/0140778 | A1* | 5/2019 | Kishikawa ........... H04L 1/1678 |
| 2019/0228133 | A1* | 7/2019 | Ansari .................. H04L 9/3247 |
| 2019/0238311 | A1* | 8/2019 | Zheng ..................... H04L 9/006 |
| 2019/0319798 | A1* | 10/2019 | Chalkias ............... H04L 9/3239 |
| 2019/0319800 | A1 | 10/2019 | Misoczki |
| 2019/0347654 | A1 | 11/2019 | Lu |
| 2019/0364042 | A1 | 11/2019 | Liu |
| 2020/0019959 | A1* | 1/2020 | Fan ........................ G06Q 20/36 |
| 2020/0052886 | A1 | 2/2020 | Buldas |
| 2020/0117690 | A1* | 4/2020 | Tran .................. G06F 16/90332 |
| 2020/0145190 | A1* | 5/2020 | Venkataramappa ......................... H04L 9/3239 |
| 2020/0153608 | A1 | 5/2020 | Wang |
| 2020/0211011 | A1* | 7/2020 | Anderson .............. G06Q 20/06 |
| 2020/0233978 | A1* | 7/2020 | Sofia .................. G06F 16/24573 |
| 2020/0242597 | A1* | 7/2020 | Baretta ............... G06Q 20/3823 |
| 2020/0250172 | A1 | 8/2020 | Busjaeger |
| 2020/0250184 | A1 | 8/2020 | Frampton |
| 2020/0272619 | A1* | 8/2020 | Alferov .................. H04L 9/0643 |
| 2020/0273026 | A1* | 8/2020 | Soni ...................... H04L 9/0643 |
| 2020/0314194 | A1 | 10/2020 | Thomas |
| 2020/0341951 | A1 | 10/2020 | Oberhofer |
| 2020/0402058 | A1 | 12/2020 | Zhou |
| 2021/0216536 | A1 | 7/2021 | Rogers |
| 2021/0282009 | A1 | 9/2021 | Krishnamurthy |
| 2021/0297264 | A1* | 9/2021 | Filipek .................. H04L 9/3297 |
| 2021/0334738 | A1 | 10/2021 | Jelvis |
| 2021/0334769 | A1* | 10/2021 | Kress .................... G06Q 20/383 |
| 2023/0325763 | A1 | 10/2023 | Wing |

FOREIGN PATENT DOCUMENTS

| | | | | |
|---|---|---|---|---|
| CN | 110084068 | A | * 8/2019 | ............. G06F 21/60 |
| CN | 110147668 | A | * 8/2019 | ............. G06Q 40/04 |
| CN | 110505239 | A | * 11/2019 | .......... H04L 63/123 |
| CN | 110556171 | A | * 12/2019 | .......... G06F 16/252 |
| CN | 110928950 | | 3/2020 | |
| CN | 111209334 | | 5/2020 | |
| JP | 4606599 | B2 | * 1/2011 | ............ B41J 13/103 |
| JP | 2021044776 | | 3/2021 | |
| KR | 20170101567 | A | * 9/2017 | ............. G06F 21/64 |
| KR | 20190127500 | A | * 11/2019 | ......... G06Q 20/3829 |
| KR | 20210009791 | A | * 1/2021 | ............. H04L 9/50 |
| WO | WO-2017091530 | A1 | * 6/2017 | ............. G06Q 20/06 |
| WO | WO-2018007828 | A2 | * 1/2018 | ............. G06Q 40/02 |
| WO | 2019078411 | | 4/2019 | |
| WO | 2020124067 | | 6/2020 | |

OTHER PUBLICATIONS

Specification and Verification of Event Detectors and Responses by Cynthia Disenfeld and Shmuel Katz (Department of Computer Science—Israel Institute of Technology) pp. 12; Mar. 24-29, 2013.*
Process Mining of Event Logs in Auditing: Opportunities and Challenges by Mieke Jans, Michael Alles and Miklos Vasarhelyi pp. 32; Version: Feb. 15, 2010.*
Blockchain-Based Traffic Event Validation and Trust Verification for VANETs by Yao-Tsung Yang, Li-Der Chou, Chia-Wei Tseng, Fan-Hsun Tseng, and Chien-Chang Liu pp. 10; Date of publication Mar. 8, 2019.*
Blockchain Enabled Privacy Audit Logs By Andrew Sutton and Reza Samavi pp. 17; Oct. 2017.*
Specification and Verification of Event Detectors and Responses by Cynthia Disenfeld and Shmuel Katz pp. 12; Mar. 24-29, 2013.*

(56) References Cited

OTHER PUBLICATIONS

Jing Chen, Shixiong Yao, Quan Yuan, Kun He, Shouling Ji and Ruiying Du, (CertChain: Public and Efficient Certificate Audit Based on Blockchain for TLS Connections), IEEE Conference on Computer Communications (Year: 2018).*

Juan Carlos López-Pimentel, Omar Rojas and Raúl Monroy, (Blockchain and off-chain: A Solution for Audit Issues in Supply Chain Systems), IEEE (Year: 2020).*

Andrew Sutton and Reza Samavi, (Blockchain Enabled Privacy Audit Logs), ResearchGate Conference Paper • Oct. 2017.*

Andrew Sutton and Reza Samavi; "Blockchain Enabled Privacy Audit Logs"; Conference Paper Published at: https://www.researchgate.net, pp. 17; Publication Date: Oct. 2017.*

Burkhart et al., "SEPIA: Privacy-preserving aggregation of multi-domain network events and statistics." Network 1. 101101. Aug. 2010. Retrieved on Apr. 26, 2021 from <https://dl.acm.org/doi/abs/10.5555/1929840>.

Ren et al., "Mutual verifiable provable data auditing in public cloud storage." Journal of Internet Technology 16.2 (2015): 317-323. Mar. 1, 2015, Retrieved on Apr. 24, 2021 from <http://uclab.khu.ac.kr/resources/publication/J_203.pdf>.

Nakasumi et al., "Information Sharing for Supply Chain Management based on Block Chain Technology," Faculty of Economics, Komazawa University, Tokyo, Japan, pp. 10; IEEE 19th Conference on Business Informatics (Year: 2017).

Francesco Scicchitano, Angelica Liguori, Massimo Guarascio, Ettore Ritacco, and Giuseppe Manco; ("A Deep Learning Approach for Detecting Security Attacks on Blockchain"); pp. 11; (Year: 2020).

Staples, M., Chen, S., Falamaki, S., Ponomarev, A., Rimba, P., Tran, A. B., Weber, I., Xu, X., Zhu, J., ("Risks and U Opportunities for Systems Using Blockchain and Smart Contracts"); Data61 (CSIRO); pp. 60, May 2017.

\* cited by examiner

AUDITING FOR EVENTS

BACKGROUND OF THE INVENTION

A database system stores data accumulated over time. For example, a database system stores financial system data, referential data, and transactional data (e.g., query data, command data, event data, etc.). The database system provides functionality for adding new data to create and persist a new event (i.e., a mutation), querying the stored event data, building reports based on the data, providing event information in response to client queries, etc. However, each data entry in the database system may or may not be correct. For example, the data might have been entered incorrectly or the true value of the data might have been altered (e.g., by accident or by malicious intent).

BRIEF DESCRIPTION OF THE DRAWINGS

Various embodiments of the invention are disclosed in the following detailed description and the accompanying drawings.

DETAILED DESCRIPTION

Figure 1:
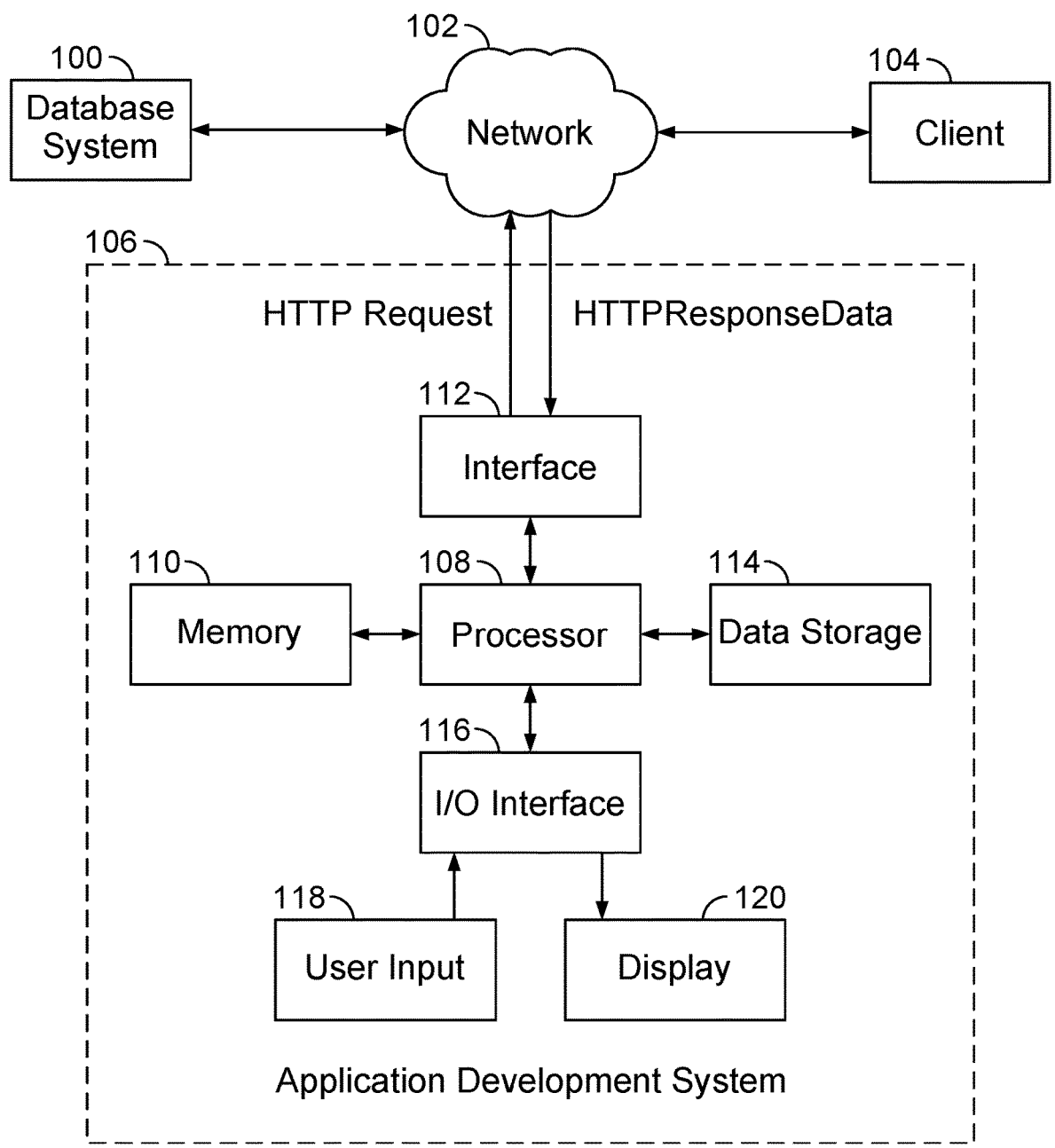
FIG. 1 is a block diagram illustrating an embodiment of a system for committing event data, for querying the state of an aggregate, and for creating a projection.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for committing event data is disclosed. The system comprises an interface and a processor. The interface is configured to receive input data and a client key. The processor is configured to generate an Nth sequence number; determine an Nth event hash using the input data, an N−1 signature, and the Nth sequence number; encrypt the Nth event hash with the client key to generate an Nth signature; generate an Nth event from the input data, the N−1 signature, the Nth sequence number, and the Nth signature; in response to an aggregate N−1 of one or more prior events being valid, apply Nth event onto aggregate N−1. In some embodiments, the aggregate N−1 comprises an aggregate that has N−1 events, where N is an integer.

A system for querying a state of aggregate N is disclosed. The system comprises an interface and a processor. The interface is configured to receive request to query the state of the aggregate N and receive a client key. The processor is configured to rehash each event input data of the aggregate N with its corresponding sequence number and a prior event signature to generate a hash value; reencrypt the hash value using the client key to create a check signature; determine whether the check signature is equal to the prior event signature; in response to each check signature being equal to the prior event signature, replay the events of the aggregate N to generate and provide the state of the aggregate N; and in response to a check signature not being equal to the prior event signature, indicate that the aggregate N is not valid. In some embodiments, the aggregate N comprises an aggregate that has N events, where N is an integer.

A system for creating a projection is disclosed. The system comprises an interface and a processor. The interface is configured to receive request to create a projection up to a target event in an aggregate N and receive a client key. The processor is configured to rehash each event input data of the aggregate N with its corresponding sequence number and a prior event signature to generate a hash value; reencrypt the hash value using the client key to create a check signature; determine whether the check signature is equal to the prior event signature; in response to each check signature being equal to the prior event signature, replay the events of the aggregate N to generate and provide the projection; and in response to a check signature not being equal to the prior event signature, indicate that the aggregate N is not valid. In some embodiments, the aggregate N comprises an aggregate that has N events, where N is an integer.

A system for auditing event data is disclosed. The system comprises an interface and a processor. The interface is configured to receive an audit query request and a client key. The processor is configured to determine whether the audit query request is valid; determine whether a chain of events is stored in an audit store, wherein the chain of events is associated with the audit query request; and provide data for the audit query request in response to determining that the chain of events is stored in the audit store.

The disclosed system provides proof that the events of a particular object have not been altered or tampered with in anyway using cryptography. To ensure the data integrity of a large database, data can be stored as a sequential ledger of immutable events (e.g., as in blockchain technology). Before exposing this data to an end user (i.e., a client), the ledger of events is verified (e.g., using cryptography) to provide proof that the data comprising a particular event or series of events (i.e., an object), have not been altered or tampered with in anyway in order to resolve the object's true and current application state (i.e., the entire history of the events comprising a particular object).

An event is a data entry that represents a change in an application state (i.e., a mutation). In a financial system, examples of events include TradeOrderFilled, ClientNotified, AccountBalanceUpdated, or any other appropriate type of event. An application state does not change until a proposed mutation is 'persisted' into a database (e.g., stored in an event store). In some embodiments, the database comprises an append-only write database.

In computing, a persistent data structure is a data structure that always preserves the previous version of itself when it is modified. Such data structures are effectively immutable, as their operations do not update the object in-place, but instead always yield a new updated object.

In event sourcing, every change in state of an object is stored as an event. Events are stored in sequence and can be "replayed" in order to derive the current state of an application. The capabilities that this persistence model affords are:

Auditability: In some embodiments, events can be stored with other metadata about the change, such as who performed the action and when it was performed. This, effectively, becomes a robust audit log that cannot be circumvented without affecting the active state of the application.

Complete Rebuild: In various embodiments, the database system (i.e., the system for committing event data) may decide to cache or pre-compute the current state of the application for traditional query purposes. We call this a 'projection' of the event store. These projections are "copies" of the current state and should not be treated as a source of truth. A litmus test to see if event sourcing is being done correctly is the ability to discard these projections without any loss of data. This allows data to be represented in different ways (e.g., row/column, graph, key/value, etc.) to optimize performance for different access patterns, all without touching the actual source of truth. In some embodiments, the projection includes incorporating modification and/or deletions as of an effective moment/date of an entry in the database system even if the entry is later in the entry log (e.g., the entry or actual date of the entry is after the effective moment/date).

Temporal Queries: In some embodiments, certain use cases will want to execute based on a past state of the system's data (e.g., re-running a report as of a date in the past). For example, the persistence model allows rebuilding the state as of an arbitrary date in the past and running business logic against it.

Event Replay: In some embodiments, event replay provides for looking at a past event, modifying it, and replaying after to see the consequences of that change. For example, this can be helpful for hypothetical scenario modeling or to understand the impact of a bug or flaw in the system.

To ensure that an application state has not been tampered with (e.g., by a malicious actor injecting a false event within the event chain), the disclosed system uses a combination of hashing and encryption. The characteristics of a good hashing algorithm are that it is deterministic, fixed length, and sufficiently difficult to calculate to prevent brute force attack (e.g., SHA-1, SHA-2, SHA-256, SHA5, etc.). In some embodiments, the hash is salted with a random number to provide additional security against precomputation attacks, such as Rainbow Table attacks. Once an event is hashed, the resultant fixed-length hash value represents all of the details about that event. For a next event, the hash value from the previous N−1 event is inserted into the new event (N) and a new hash is generated for the event. The new hash implicitly includes the hash from the prior event. That means if a malicious hacker wanted to alter one of the events within an event chain, they would also have to alter every event after that to keep the hashing chain consistent. This adds a layer of complexity which can slow down a bad actor.

For added security, the disclosed system adds an additional step by using an encryption algorithm to encrypt the hash that is stored with the event. The encryption algorithm uses a private key which is stored in a separate secured system (e.g., a key management service). In some embodiments, the key is accessible only by the client. No other key can be used to get the encrypted hashes to match. To perform an attack, a malicious hacker would have to get the underlying non-encrypted hashes to match AND successfully hack into the key management service. In some embodiments, the key management service has access logging that is sent to a secure account and/or any other appropriate levels of security.

As legacy systems are becoming increasingly difficult to protect from bad actors, internal or external, the disclosed system improves upon the current art by providing both a high level of data granularity and a fully-auditable data model by proving that the events of a particular object have not been altered or tampered with in any way. For example, compliance and regulations (e.g., within the financial services industry) will be easier to comply with by showing a higher level of data integrity.

In some embodiments, the system improves the computer by providing security for stored entries in a database. The data in a stored entry is secured using the system to prevent alteration and tampering of the stored entry by linking the stored entry to other entries. This makes the computer better by enabling proof of the integrity of the data used for processing.

In various embodiments, the disclosed system is used to build one or more Application Programming Interfaces (APIs). In some embodiments, the APIs are focused on a particular domain (e.g., the financial services domain). A domain (or 'application domain') defines a set of common requirements, terminology, and functionality for any software program constructed to solve a problem in the area of computer programming (e.g., how to securely track and query financial transactions).

In some embodiments, the disclosed system utilizes Domain-Driven Design (DDD) to design and generate one or more APIs (e.g., for a client). DDD is an approach to software development for complex needs by connecting the implementation to an evolving model. DDD is predicated on: (i) placing the primary focus on the core domain and domain logic; (ii) basing complex designs on a model of the domain; and (iii) initiating a collaboration between technical and domain experts to iteratively refine a conceptual model that addresses particular domain problems. A key outcome of practicing DDD is a common framework for discussing a domain between domain experts, product managers and developers. A common framework allows product engineers to spend most of their time building and documenting a domain model (e.g., an object-oriented Python data model), and as little time as possible converting that model into code.

In some embodiments, the common framework utilizes a data modeling library. In some embodiments, the data modeling library is used to help translate rudimentary concepts and client requirements (i.e., an 'offline domain model') into API code (e.g., Python code). In various embodiments, the data modeling library is used to enrich the domain model with metadata, both general and domain-specific (e.g., additional information about the field types, user interface hints, validation information, etc.).

In some embodiments, a persistence library is used to simplify generating API code (e.g., by concealing the complexity of event sourcing). A persistence library together with a request processing scheme (i.e., a persistence system) allows developers to write additional persistence-time logic into one place, instead of across a multiplicity of services. In various embodiments, the persistence system is also used to store logs, metrics, and/or encrypt data, or any other appropriate data.

FIG. 1 is a block diagram illustrating an embodiment of a system for committing event data, for querying the state of an aggregate, and for creating a projection. In the example shown, Database System 100 is connected to Client 104 and Application Development System 106 via Network 102. In some embodiments, Network 102 comprises a communication network. In various embodiments, Network 102 comprises wired and/or wireless communication networks comprising standard, hybrid, and/or proprietary networks (e.g., a local area network, a wide area network, a virtual private network, etc.), proxy servers, and data centers. In some embodiments, Network 102 comprises a Content Distribution Network. In some embodiments, Network 102 comprises components of a cloud computing platform—for example, comprising a front end platform (e.g., a fat client, a thin client, etc.), a back end platform (e.g., servers, data storage, etc.), a cloud based delivery, and a network (e.g., Internet, Intranet, Intercloud, etc.).

In the example shown, Application Development System 106 comprises Processor 108, Memory 110, Interface 112, Data Storage 114, I/O Interface 116, User Input 118, and Display 120. In various embodiments, Application Development System 106 is used to generate Application Programming Interfaces (APIs) for responding to commands and/or queries (e.g., from a user using Client 104). In various embodiments, Application Development System 106 is used to generate APIs for responding to commands and/or queries in a secure manner—for example, using cryptography (e.g., to provide proof that the data comprising a particular event or series of events has not been altered or tampered with in anyway). In some embodiments, Application Development System 106 is used to generate APIs for responding to a command to commit new event data to an existing aggregate of events, to read event data in an existing aggregate of events, to create new aggregate(s) of events, to modify events in an existing aggregate of events, and/or to delete events or aggregate events.

In some embodiments, an other API is generated that is used to construct an API (e.g., for a client) within a particular domain (e.g., the financial services domain). In some embodiments, the other API comprises a domain model—for example, an object-oriented data model (e.g., written in the Python programming language). In some embodiments, a user (e.g., a computer programmer) inputs code (e.g., via User Input 118 and I/O Interface 116) to run on Processor 108 (e.g., to generate and/or test one or more domain models). In some embodiments, code is stored in Memory 110 (e.g., temporarily, long term, short term, etc.) for use by Processor 108, and/or stored in Data Storage 114 (e.g., for later retrieval and continued development).

In various embodiments, APIs generated within Application Development System 106 are transmitted to Database System 100 (e.g., via Interface 112). In some embodiments, Interface 112 is used to transmit requests and responses (e.g., using the hypertext transfer protocol (HTTP)) to Application Development System 106—for example, requests and responses related to the use of Database System 100 (e.g., by a client).

In various embodiments, a dynamic data query and manipulation language (e.g., the GraphQL language) is used to request and/or respond to the generation of one or more APIs. A dynamic API language allows clients to ask for data (e.g., referential data) while specifying what shape the data can take. This allows for a more flexible API model and one that is easier to maintain (e.g., compared to architectural API protocols such as REST, XML, and SOAP).

In some embodiments, a user using Client 104 provides a command to Database System 100. Database System 100 receives the command at an API (e.g., an API generated using Application Development System 106) and processes the command. In various embodiments, the command adds to data stored by Database System 100, reads data stored by Database System 100, determines the application state of data stored by Database System 100, determines projections of data stored by Database System 100, and/or modifies copies of data stored by Database System 100, or any other appropriate action relating to data and/or metadata in Database System 100.

In some embodiments, to add data to stored data in Database System 100 the input data and/or command are validated. In response to the input data and/or command being valid, a new event data set is formed (i.e., a proposed mutation) to apply to an existing aggregate of events in Database System 100. Prior to applying the proposed mutation, the existing aggregate of events is retrieved (e.g., from a storage device within Database System 100) and validated. For example, event data is committed to Database System 100 by receiving input data and a client key from Client 104. A processor in Database System 100 is then used to generate an Nth sequence number; determine an Nth event hash using the input data, an N−1 signature, and the Nth sequence number; encrypt the Nth event hash with the client key to generate an Nth signature; generate an Nth event from the input data, the N−1 signature, the Nth sequence number, and the Nth signature; and in response to an aggregate N−1 of one or more prior events being valid, apply the Nth event onto the aggregate N−1 for storage within Database System 100. In some embodiments, the aggregate N−1 comprises an aggregate that has N−1 events, where N is an integer. In some embodiments, the sequence number starts with 0.

In various embodiments, event data is added including one or more metadata regarding the event date—for example, time/date of submission, effective time/date (e.g., the effective moment) that the data should be considered effectively having been submitted, submission user, user system location, client name, user name, or any other appropriate metadata.

In the disclosed system, modifying or deleting data from a source of truth within Database System 100 is not allowed (e.g., input data from an event within an aggregate of events). Any modifications to existing data are treated as a new event in the event chain. Any deletions are generated as a new event marking the deletion or invalidation of the aggregate. In some embodiments, the effective time/date of an event entry indicates a back dating of a submitted event data or a forward dating of a submitted data—for example, a purchase price of an item can be corrected if erroneously previously entered or a purchase price of an item can be set to be purchased in the future.

In some embodiments, to provide for corrections to data, an effective moment or time/date is stored for each event (e.g., as event metadata). The effective moment is the timestamp of when the event is desired to be thought of as having been or will be executed. This can be the same or different from the time/date that the event is recorded in the database. In the case where the event needs to act as if it was produced earlier (e.g., when determining the state of one or more events within an aggregate), the time stamp is back-dated (e.g., to the position with an event chain that contains the incorrect data). When events are replayed to determine the corrected application state, the effective moment is used to rebuild the projections (e.g., by replaying or positioning the corrected event in its effective time/date rather than the submitted time). This allows the hashed event chain to maintain its integrity while being able to correct data.

In some embodiments, the system is able to show the event data with and without modification/deletion as provided by the effective moment mechanism. In some embodiments, displaying or reporting of data later modified/deleted is marked with an indication providing the user with transparency of the modification/deletion using the effective moment mechanism.

In some embodiments, to read data stored in Database System 100 a query request is validated. In response to the query request being valid, a query-related existing aggregate of events in Database System 100 is retrieved (e.g., from a storage device within Database System 100) and validated (e.g., by a processor within Database System 100). In various embodiments, input data from one or more events is provided (e.g., a list of one or more financial transactions and their dates, etc.).

In various embodiments, the validated aggregate of events is replayed, in part or in its entirety, to generate the queried state of the aggregate (e.g., by a processor in Database System 100). The state of an aggregate differs from its contained input data in that it considers the cumulative impact of events on a particular set of tracked data (e.g., as in providing the cash or share balance of a financial account at a given date). In various embodiments, the queried state of the aggregate is determined from a projection of a prior or current state of the aggregate (e.g., retrieved from a storage device or computer memory within Database System 100). In various embodiments, the queried state of the aggregate is generated by replaying one or more new events using a projection of a prior state as the initial state (e.g., to save computational time and/or resources). In response to the queried state of the aggregate being generated, it is provided—for example, via an interface within Database System 100 (e.g., to Client 104 via Network 102). For example, a system for querying a state of an aggregate N (e.g., an aggregate that has N events) comprises an interface and a processor. The interface is configured to receive request to query the state of the aggregate N and receive a client key. The processor is configured to rehash each event input data of the aggregate N with its corresponding sequence number and a prior event signature to generate a hash value; reencrypt the hash value using the client key to create a check signature; determine whether the check signature is equal to the prior event signature; in response to each check signature being equal to the prior event signature, replay the events of the aggregate N to generate and provide the state of the aggregate N; and in response to a check signature not being equal to the prior event signature, indicate that the aggregate N is not valid.

In some embodiments, to generate a prior or current state of an aggregate of events stored in Database System 100, a projection request is validated. In response to the projection request being valid, a projection-related aggregate of events in Database System 100 is retrieved and validated. In response to the aggregate of events being valid, the events are replayed, in part or entirety, to generate the aggregate's state at the requested point of projection (i.e., corresponding to a particular event within the aggregate's event chain). In various embodiments, the aggregate's state at the requested point of projection is cached or stored in Database System 100 (e.g., in computer memory or in a storage device). In various embodiments, the aggregate's state is provided—for example, via an interface within Database System 100 (e.g., via Network 102 to Client 104 or the user of Application Development System 106). For example, a system for creating a projection comprises an interface and a processor. The interface is configured to receive request to create a projection up to a target event in an aggregate N and receive a client key. The processor is configured to rehash each event input data of the aggregate N with its corresponding sequence number and a prior event signature to generate a hash value; reencrypt the hash value using the client key to create a check signature; determine whether the check signature is equal to the prior event signature; in response to each check signature being equal to the prior event signature, replay the events of the aggregate N to generate and provide the projection; and in response to a check signature not being equal to the prior event signature, indicate that the aggregate N is not valid.

In some embodiments, to modify the input data of one or more events within an aggregate of events stored in Database System 100, a modification request for modeling is validated. In response to the modification request for modeling being valid, a modification-related aggregate of events for modeling in Database System 100 is retrieved and validated. A modification-related aggregate of events for modeling comprises a validated copy of the aggregate of interest. In response to the aggregate of interest being valid, the one or more events requested to be modified are replaced with modified input data for modeling. In various embodiments, the modified aggregate of events is replayed, in part or entirety, to generate one or more new aggregate states (e.g., to see the consequences of the one or more changes). This can be helpful for hypothetical scenario modeling or to understand the impact of a bug or flaw in the system. In various embodiments, the one or more new aggregate states are provided—for example, via an interface within Database System 100 (e.g., via Network 102 to Client 104 or the user of Application Development System 106). For example, a system for querying a state of an aggregate N comprises an interface and a processor. The interface is configured to receive request to query the state of the aggregate N and receive a client key. The processor is configured to rehash each event input data of the aggregate N with its corresponding sequence number and a prior event signature to generate a hash value; reencrypt the hash value using the client key to create a check signature; determine whether the check signature is equal to the prior event signature; in response to each check signature being equal to the prior event signature, replay the events of the aggregate N to generate the aggregate N and insert any appropriate modifications and provide the state of the modified aggregate N; and in response to a check signature not being equal to the prior event signature, indicate that aggregate N is not valid. In some embodiments, the modifications are placed using an effective moment associated with the modification data.

In some embodiments, modifications to stored events are entered into the database by adding an event that is appended to the database chain and includes an effective moment metadata that indicates where in the sequence of the data that the modification is to be used. In some embodiments, deletions of stored events are entered into the database by adding an event that is appended to the database chain and includes an effective moment metadata that indicates where in the sequence of the data that the deletion is to be applied.

In some embodiments, in response to the check signature not being equal to the prior or persisted event signature, a verification status (e.g., verified: TRUE or verified: FALSE) is associated with each event of an aggregate as well as an overall verification status for the aggregate as a whole (e.g., all events verified: TRUE or any event verified: FALSE). In some embodiments, a service is informed by the query and mutation process that events have been deemed to be invalid. The service then updates a flag to indicate that a particular event is invalid, and thus the Aggregate by definition is also invalid. In some embodiments, the service provides messages to a notification service to notify an administrator and/or user that an invalid event/aggregate has been detected. In various embodiments, after review, the service provides a convenient set of remediation features such as, rolling back the aggregate to the last valid state or performing a manual adjustment to "correct" the affected aggregate. In some embodiments, the service provides an audit log of all events for visual reporting purposes to an administrator and/or user.

In various embodiments, in response to the check signature not being equal to the prior or persisted event signature, an indication is provided that there was an error (e.g., that the aggregate is compromised), an alert is provided (e.g., an alert via email), an entry in a log (e.g., a SEVERE log of an internal monitoring system), or any other appropriate indication or notification.

In some embodiments, in response to the check signature not being equal to the prior or persisted event signature, the system reverts data back to a state that is not compromised (e.g., a state before any tampering is detected). For example, if the $7^{th}$ event in an aggregate fails the check signature test, the system reverts the data back to the 6th event state.

In some embodiments, the system regenerates the $7^{th}$ event using a stored copy of the input data for the $7^{th}$ event.

Figure 2:
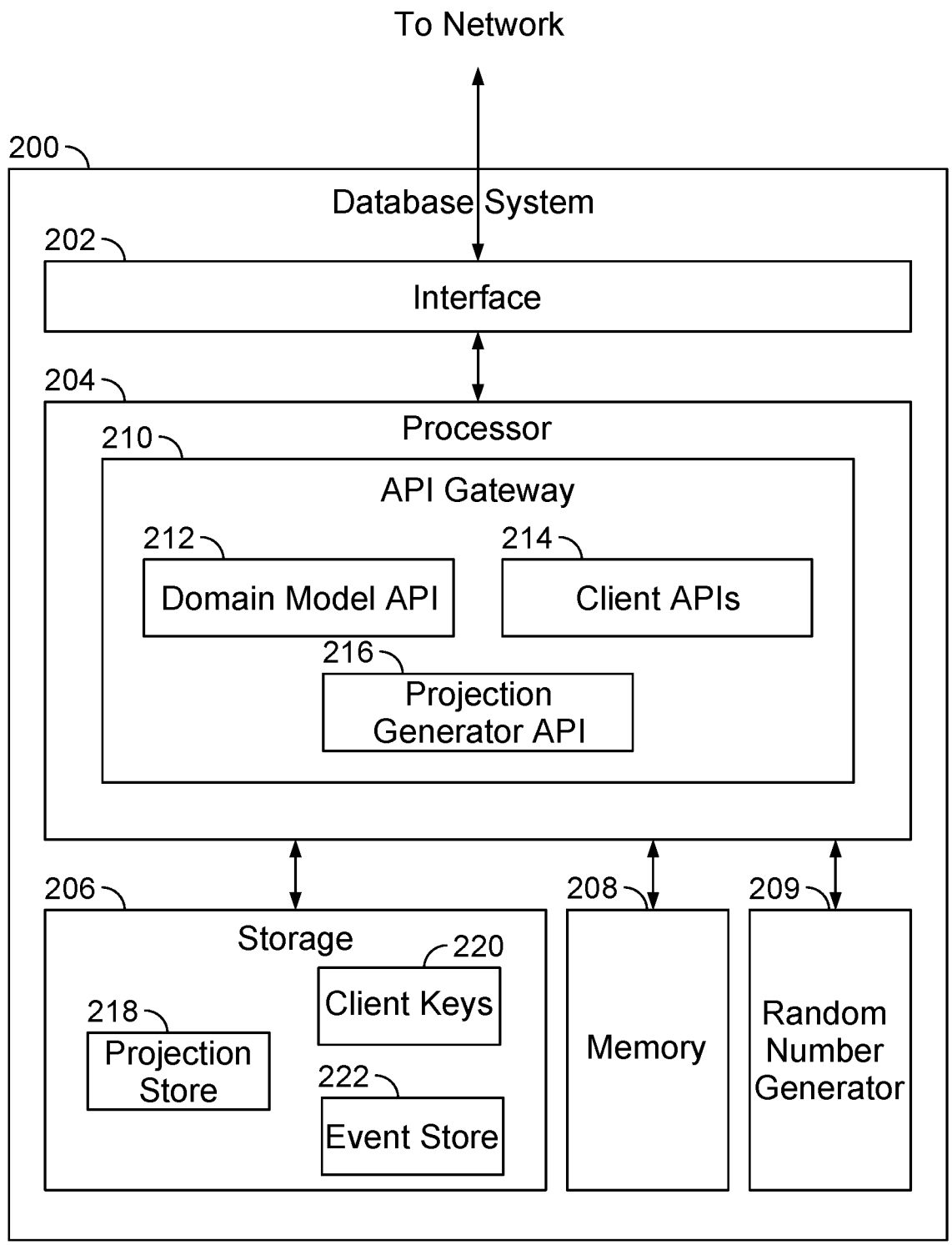
FIG. 2 is a block diagram illustrating an embodiment of a database system.

FIG. 2 is a block diagram illustrating an embodiment of a database system. In some embodiments, Database System 200 corresponds to Database System 100 of FIG. 1. In the example shown, Database System 200 comprises Interface 202, Processor 204, Storage 206, Memory 208, and Random Number Generator 209. In various embodiments, Interface 202 is used to transmit requests (e.g., from a client) and responses (e.g., as generated by Processor 204) to users of a Client or an Application Development System. In various embodiments, requests and responses (e.g., adding data, reading data, determining an application state, determining a projection, and/or modifying copies of data) are stored in Storage 206 (e.g., for long term storage) and/or Memory 208 (e.g., to provide instructions to Processor 204).

In the example shown, Processor 204 comprises API Gateway 210. In various embodiments, API Gateway 210 manages communications to and from Domain Model API 212, Client APIs 214, and/or Projection Generator API 216. In some embodiments, Domain Model API 212 is used to generate one or more Client APIs (e.g., according to directions transmitted by an Application Development System). For example, Client APIs 214 comprise various tracking and query functions associated with a particular domain (e.g., tracking and responding to account balance queries within a financial domain). In various embodiments, Domain Model API 212 and/or Client APIs 214 serve one or more Clients. In some embodiments, Projection Generator API 216 is used to generate an aggregate's state (i.e., corresponding to a particular event within the aggregate's event chain). In various embodiments, the aggregate's state at the requested point of projection is cached (e.g., in Memory 208) and/or stored (e.g., in Projection Store 218). In some embodiments, the aggregate's state is provided to a user, for example, via Interface 202 (e.g., to a user of a Client or an Application Development System). In some embodiments, a specific event's data is provided to a user in response to a request instead of a rolled up aggregate, in which case, the event data is still validated within the chain (e.g., by checking that either prior or all of the chain signatures are appropriately linked and correct).

In some embodiments, Client Keys 220 are used (e.g., by Processor 204) to encrypt data (e.g., to encrypt a hash stored with an event to generate an event signature). An event signature is uniquely representative of the base event. In some embodiments, a random number (e.g., generated by Random Number Generator 209) is used to 'salt' the hash used to generate an event signature (e.g., to provide additional security). In some embodiments, Random Number Generator 209 is a device that generates a sequence of numbers or symbols that cannot be reasonably predicted better than by a random chance. In various embodiments, Random Number Generator 209 is a true random-number generator, a pseudo-random number generator, or a cryptographically secure pseudo-random number generator. In various embodiments, Random Number Generator 209 is hardware-based, software-based, or any appropriate combination of hardware and software.

In some embodiments, Client Keys 220 are used to reencrypt data—for example, to generate a check signature. A check signature is the reencrypted hash value from a prior event used to check that an event has not been tampered with by comparing the check signature with the original prior event signature. In some embodiments, Client Keys 220 comprise one or more private keys as used within asymmetric cryptography (i.e., public-key cryptography).

Common asymmetric key encryption algorithms include Diffie-Hellman, RSA (Rivest-Shamir-Adleman), ElGamal, DSA (Digital Signature Algorithm), ECC (Elliptic Curve Cryptography), and PKCS (Public Key Cryptography Standards). A private key ideally is a long, random (i.e., non-deterministic) number (e.g., 1,024-bits, 2048-bits, 3072-bits, etc.) that cannot easily be guessed. The length and randomness of the key depends on the algorithm being used, the strength of security required, the amount of data being processed with the key, and the crypto-period of the key (i.e., the time between key activation and key deactivation). The choice of which algorithms, key lengths, degree of randomness, and crypto-period are determined by those skilled in the art of cryptography and includes assessing the sensitivity of the data, the risk of key compromise, system implementation cost, allowable processing times, etc.

In some embodiments, Client Keys 220 are stored and managed in a secured system (e.g., a key management service). In some embodiments, Client Keys 220 are located in a separate secured system (i.e., not within Database System 200). In some embodiments, Client Keys 220 are accessible only by the Client (i.e., they are kept secret). In various embodiments, Client Keys 220 are referenced or retrieved via use of an identifier (i.e., a Client Key ID). In some embodiments, Client IDs are stored in Storage 206, or any other appropriate location or storage device.

In the example shown, Event Store 222 is used to store events (e.g., an aggregate of events comprising an event chain). An event encapsulates all data associated with a transaction as well as tracking an integer value representing the sequence number of the event for the aggregate. In some embodiments, the sequence number is gapless, sequential, and unique. In various embodiments, individual events are referenced or retrieved via the sequence number. Events are stored in sequence and can be "replayed" in order to derive the current state of an application. In some embodiments, events are stored with the corresponding event signature and a prior event signature (e.g., to be used in validating the event data). In some embodiments, wherein a random number is used to 'salt' the hash used to generate an event signature, the salt value is stored with the event. In some embodiments, events are stored with metadata related to the event (e.g., who added the event, when it was performed, etc.).

Figure 3:
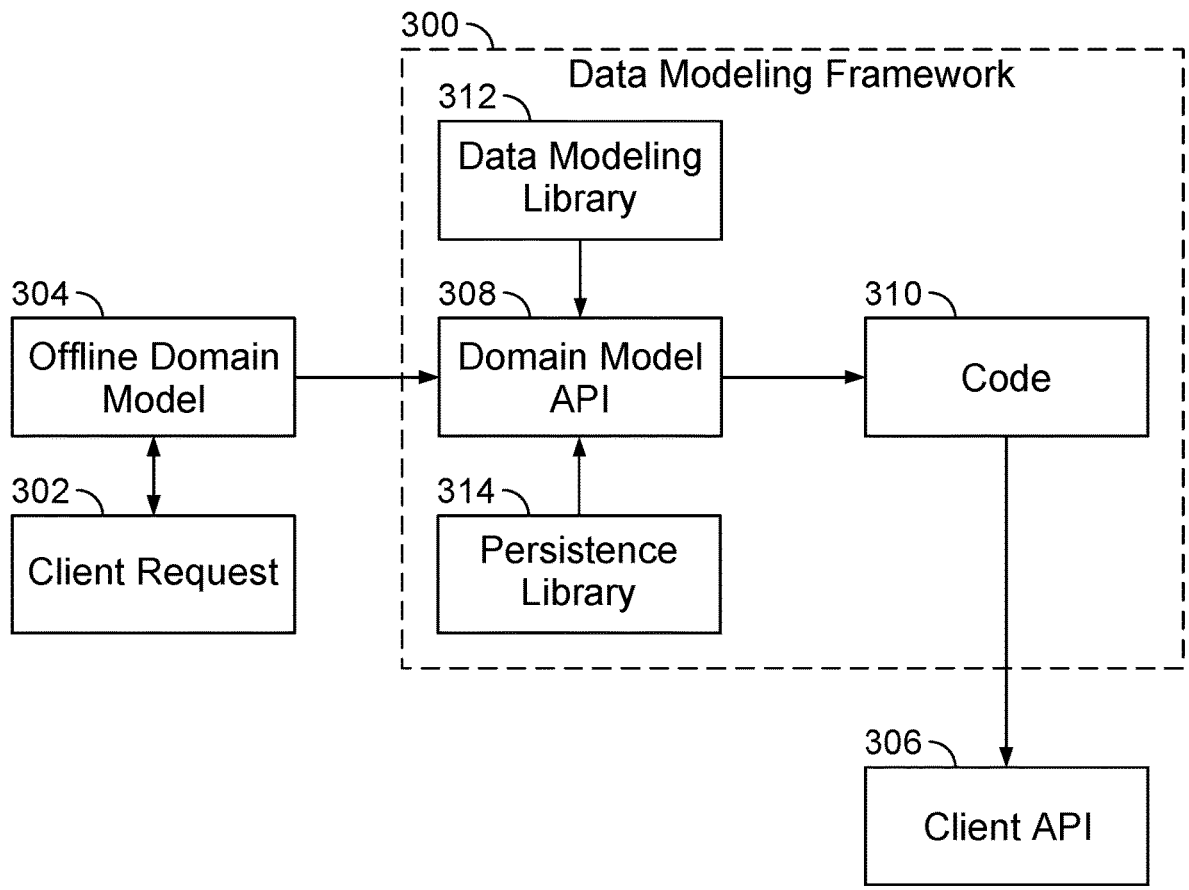
FIG. 3 is a block diagram illustrating an embodiment of a system for generating a client API (Application Programming Interface).

FIG. 3 is a block diagram illustrating an embodiment of a system for generating a client API (Application Programming Interface). In some embodiments, Client API 306 corresponds to one of the one or more Client APIs 214 of FIG. 2. In the example shown, Data Modeling Framework 300 is used to generate Client API 306 in response to Client Request 302. Data Modeling Framework 300 comprises Domain Model API 308, Code 310, Data Modeling Library 312, and Persistence Library 314.

An API is an interface or communication protocol between different parts of a computer program to simplify the implementation and maintenance of software. An API specification includes specifications for routines, data structures, object classes, variables, and/or remote calls. API is also used herein to refer to a specific kind of interface between a client and a server, which can be described as a "contract" between both—such that if the client makes a request in a specific format, it will always get a response in a specific format or initiate a defined action. This specialized form of API is termed a Web API. In some embodiments, Client API 306 comprises a Web API.

Client Request 302 is used to initiate the generation of Client API 306. In various embodiments, Client Request 302 comprises a verbal request or a written request from a client (e.g., to one or more users of an Application Development System). In some embodiments, the Application Development System corresponds to Application Development System 106 of FIG. 1. In various embodiments, Client Request 302 takes the form of an extended discussion with one or more users of the Application Development System. In some embodiments, the extended discussion relates to specifying an overall system architecture related to a particular domain (e.g., one or more question and answer sessions, design meetings, review meetings, etc.). In some embodiments, Client Request 302 is a clearly specified request to add to, or upgrade, an existing Client API (e.g., to track a particular piece of event data or metadata that has not been previously tracked).

In the example shown, Client Request 302 is an iterative process with Offline Domain Model 304. Offline Domain Model 304 is used (e.g., by one or more users of an Application Development System) (i) for the early capturing and formation of rudimentary concepts and client requirements; and (ii) to develop and formalize a specification for Domain Model API 308. In some embodiments, Client Request 302 specifies directly Offline Domain Model 304 without need for iteration. In the example shown, Offline Domain Model 304 is coded (e.g., using Python code) to generate Domain Model API 308. Domain Model API 308 is used to generate Code 310 that satisfies Client Request 302 for Client API 306. In some embodiments, Code 310 is an object-oriented programming language (e.g., Python). In some embodiments, Client API 306 is a data query and manipulation language (e.g., GraphQL). In some embodiments, Code 310 is used to generate Client API 306. In some embodiments, Client API 306 is generated directly by Domain Model API 308 without need for Code 310.

In the example shown, Domain Model API 308 utilizes Data Modeling Library 312. In some embodiments, Data Modeling Library 312 is used to help translate Offline Domain Model 304 into code for Domain Model API 308. In various embodiments, Data Modeling Library 312 is used to enrich the domain model with metadata, both general and domain-specific (e.g., additional information about the field types, user interface hints, validation information, etc.).

In the example shown, Persistence Library 314 is used to simplify generating API code (e.g., by concealing the complexity of event sourcing). In some embodiments, Persistence Library 314 provides for developers (e.g., one or more users of an Application Development System) to write additional persistence-time logic into one place, instead of across a multiplicity of services. In various embodiments, Persistence Library 314 is also used to store logs, metrics, or any other appropriate data or information useful in developing Client API 306.

Figure 4A:
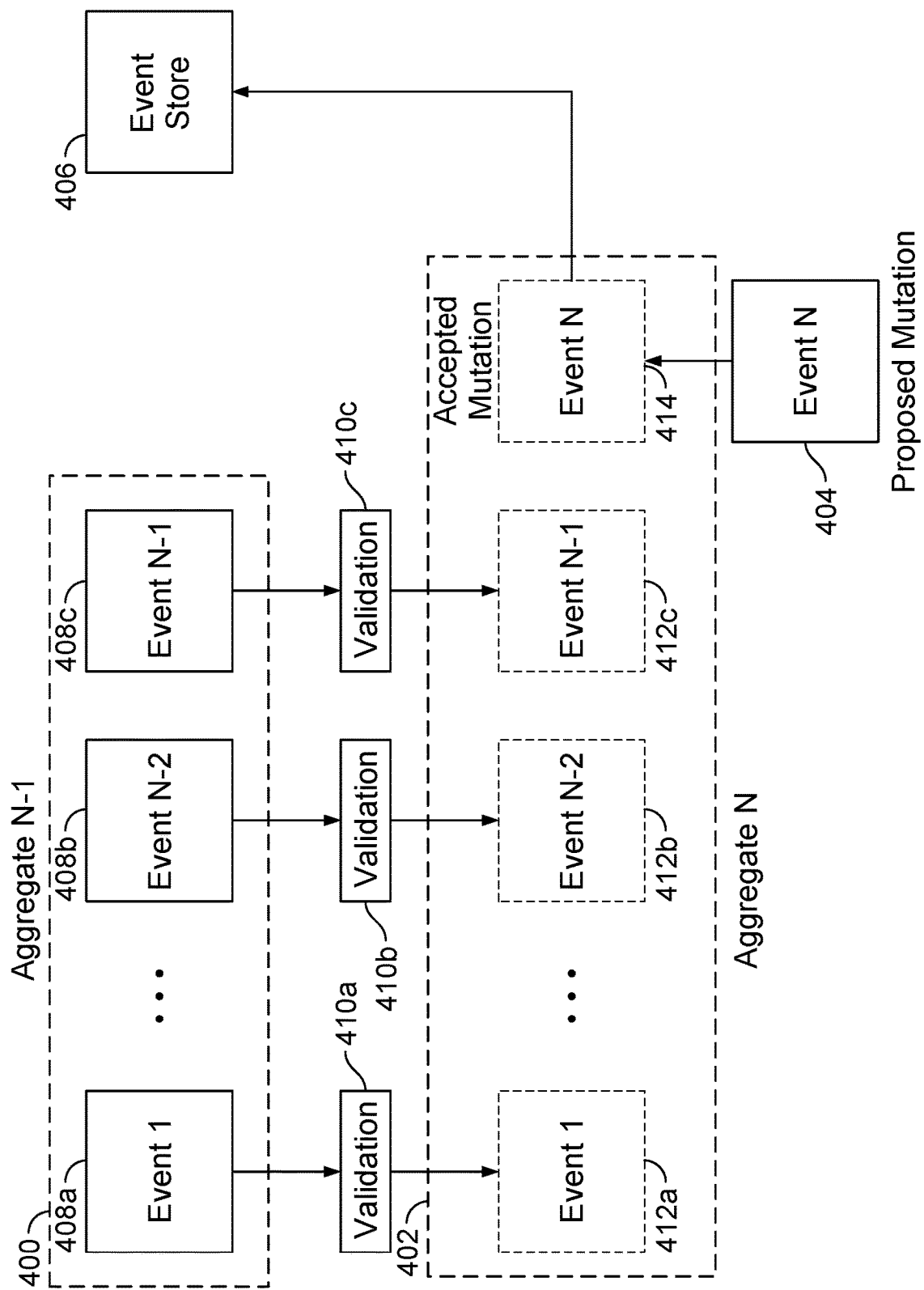
FIG. 4A is a block diagram illustrating an embodiment of a framework for committing a proposed mutation.

FIG. 4A is a block diagram illustrating an embodiment of a framework for committing a proposed mutation. In some embodiments, Event Store 406 corresponds to Event Store 222 of FIG. 2. In the example shown, the events of Aggregate N−1 400 (i.e., Event 1 408a through Event N−2 408b and Event N−1 408c) are validated prior to being applied to Aggregate N 402. In the example shown, Validation 410a results in validated Event 1 412a, Validation 410b results in validated Event N−2 412b, and Validation 410c results in validated Event N−1 412c. In response to the events of Aggregate N−1 400 being validated, a proposed mutation (i.e., Event N 404) is accepted as Event N 414 into Aggregate N 402 and Event N 414 is then stored in (i.e., committed to) Event Store 406.

In some embodiments, a processor (e.g., a processor within a database system) is configured to determine whether the events of Aggregate N−1 400 are valid by determining whether all events from Event 1 408*a* through Event N−1 408*c* are valid, wherein determining whether an event is valid comprises rehashing each event input data of Aggregate N−1 400 with its corresponding sequence number and prior event signature to generate a hash value; reencrypting the hash value using a client key to create a check signature; and determining whether the check signature is equal to the prior event signature.

In some embodiments, the system checks each event with its prior event in turn by rehashing each event input data with its corresponding sequence number and a prior event signature to generate a hash value (e.g., generating an N-M hash value for an N-M event input data within the aggregate N comprises generating the N-M hash value by hashing the N-M event input data with an N-M sequence number and an N-M−1 signature, where N-M event indicates the event with sequence number N-M where N and M are integers and N is the most recent or highest sequence number and M is a prior sequence number/event/hash value back from the most recent or highest sequence number/event/hash value). In some embodiments, the system reencrypts the hash value using the client key to create a check signature (e.g., creating an N-M check signature using the N-M hash value comprises creating the N-M check signature by reencrypting the N-M hash value using the client key to create the N-M check signature). In some embodiments, the system determines whether the check signature is equal to the prior event signature (e.g., determining that the check signature is equal to the prior event signature comprises determining that the N-M check signature and an N-M signature are equal for M from 1 to N−2). In some embodiments, the system indicates that the N-L event is not valid in response to the N-L check signature not being equal to the N-L signature for a given L, where L is an integer, where N-L event indicates the event with sequence number N-L where N and L are integers and N is the most recent or highest sequence number and L is a check signature/event back from the most recent or check signature/event.

Figure 4B:
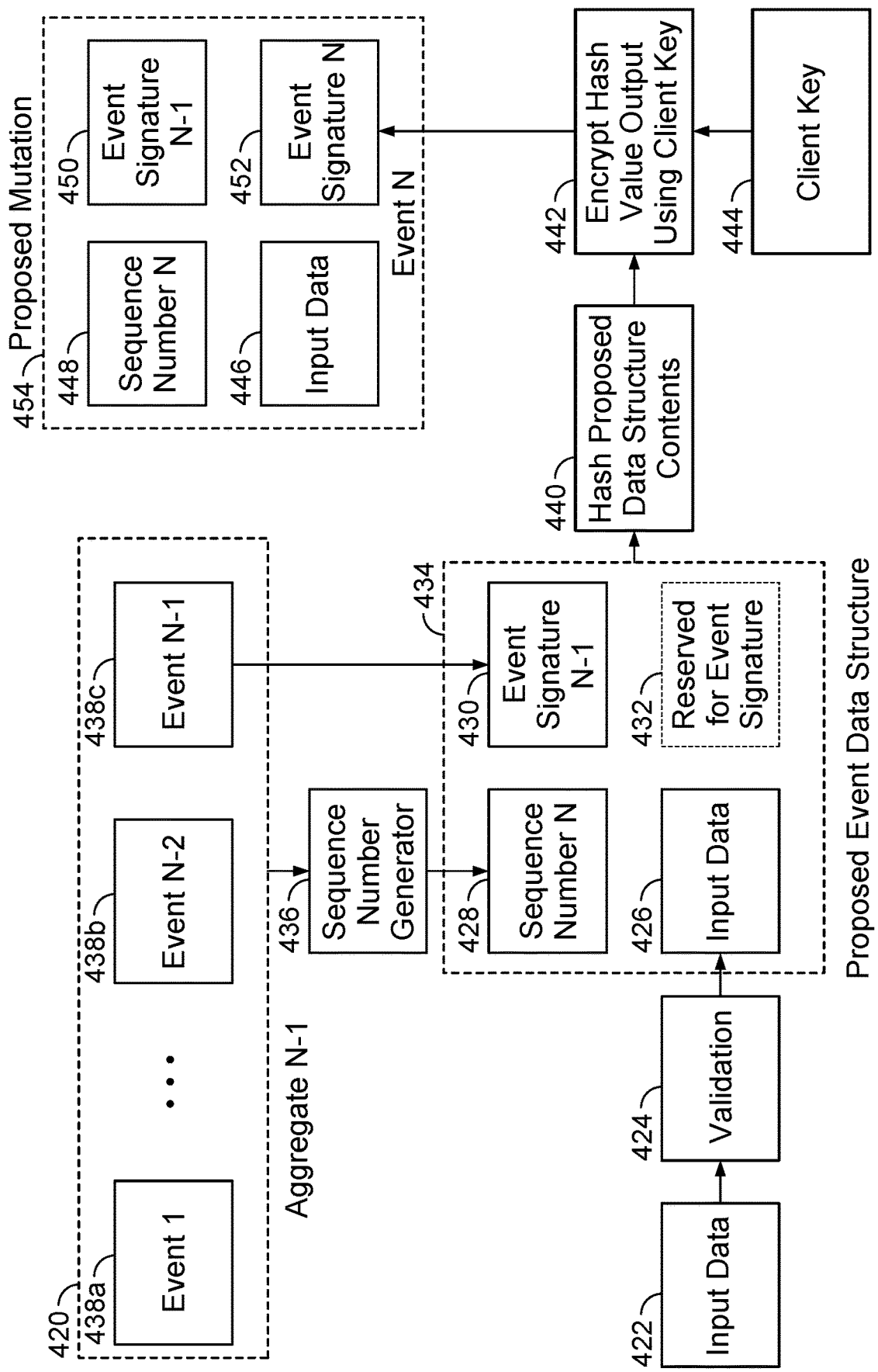
FIG. 4B is a block diagram illustrating an embodiment of a framework for creating a proposed mutation.

FIG. 4B is a block diagram illustrating an embodiment of a framework for creating a proposed mutation. In some embodiments, the proposed mutation Event N 454 corresponds to the proposed mutation Event N 404 of FIG. 4A. In some embodiments, Aggregate N−1 420 corresponds to Aggregate N−1 400 of FIG. 4A. Aggregate N−1 400 comprises Event 1 438*a* through Event N−2 438*b* and Event N−1 438*c*. In some embodiments, Event 1 438*a* through Event N−2 438*b* and Event N−1 438*c* corresponds to Event 1 408*a* through Event N−2 408*b* and Event N−1 408*c* of FIG. 4A. In some embodiments, Aggregate N−1 comprises an aggregate with N−1 events.

In the example shown, Input Data 422 is received for proposed application to Aggregate N−1 420 in the form of Proposed Event Data Structure 434. In some embodiments, a command is included with (i.e., accompanies) Input Data 422—for example, to indicate which Aggregate (e.g., an Aggregate in an Event Store) to apply Input Data 422.

Input Data 422 is validated by Validation 424. In the example shown, a processor (not shown) (e.g., a processor within a database system) is configured to receive a command accompanying Input Data 422 and performs Validation 424, wherein determining whether the command is valid comprises determining whether the command is valid syntactically and/or whether the data of Input Data 422 are appropriate for the command including determining one or more of the following: whether the data is within range, whether the data is of appropriate data type, and/or whether the data matches command input parameters.

In response to Input Data 422 being valid, Input Data 422 is applied to Proposed Event Data Structure 434. In some embodiments, Proposed Event Data Structure 434 is an object-oriented data structure (e.g., referenced by an identifier). In some embodiments, the data structure comprises a format to receive input data, an identifier, a proposed event signature, and a prior event signature. In the example shown, Proposed Event Data Structure 434 comprises a data structure configured to receive Input Data 422, Sequence Number N 428, Event Signature N−1 430, and Event Signature N 446.

An identifier of Aggregate N−1 420 is used by Sequence Generator 436 to generate Sequence Number N 428. In some embodiments, Sequence Generator 436 is a computer program (e.g., running on a processor). In some embodiments, Sequence Generator 436 generates a sequence number that is gapless, sequential, and unique. In some embodiments, the sequence number is an object-oriented data structure (e.g., configured to act as an identifier). In some embodiments, the data structure comprises a format to receive one or more sequences.

In the example shown, Sequence Number N 428 and Event Signature N−1 430 (i.e., the event signature accompanying Event N−1 438*c*) are applied to Proposed Event Data Structure 434.

Prior to receiving Event Signature N 446 into Proposed Event Data Structure 434, Input Data 422, Sequence Number N 428, and Event Signature N−1 430 are hashed (in 440). The resultant hash value from 440 is encrypted in 442 using Client Key 444 to generate Event Signature N 446. Event Signature N 446 is then applied to Proposed Event Data Structure 434 in the space Reserved for Event Signature 432 to generate Proposed Mutation 448.

Figure 5A:
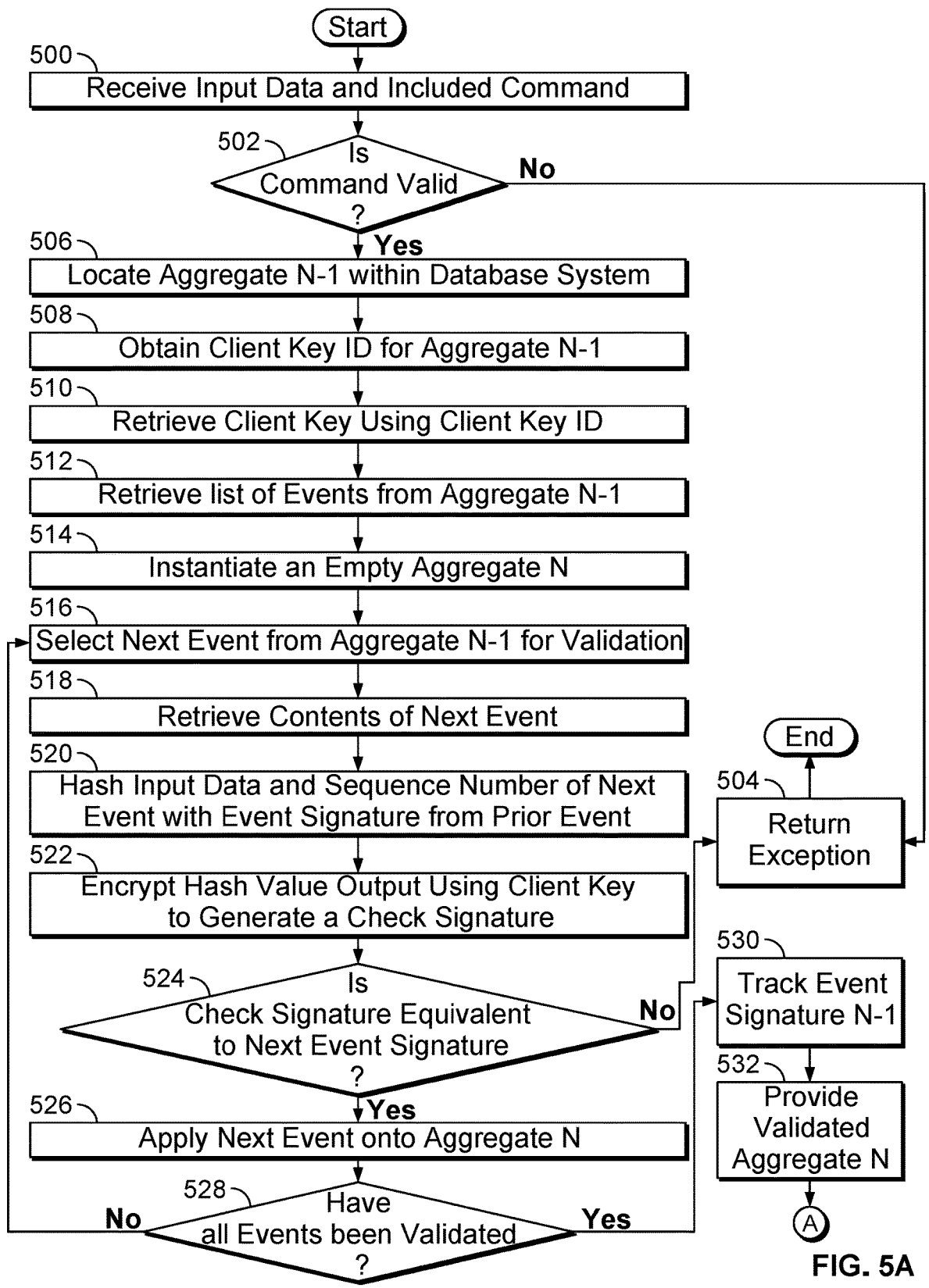
FIGS. 5A and 5B are a flow diagram illustrating an embodiment of a method for committing a proposed mutation.
Figure 5B:
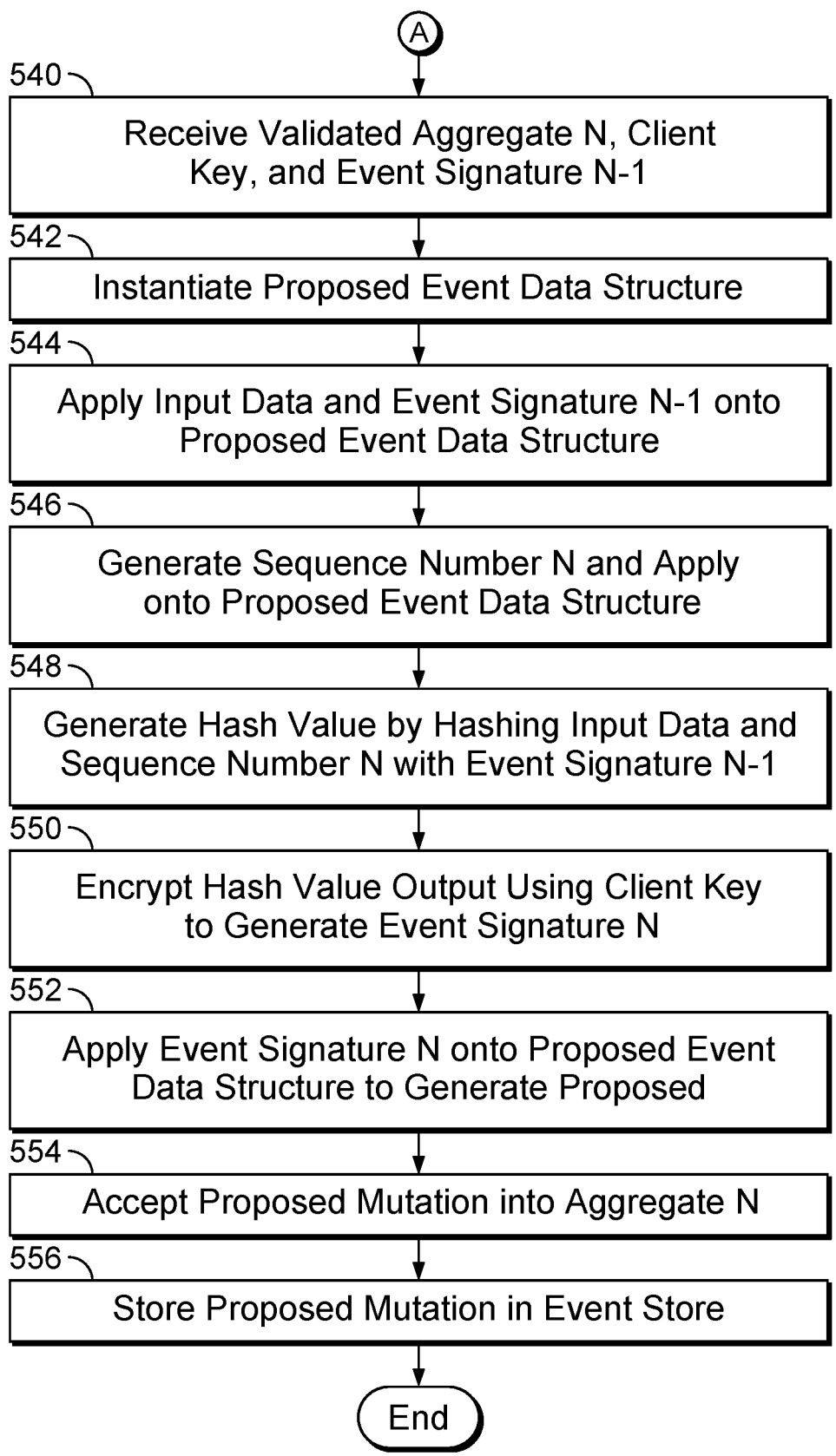

FIGS. 5A and 5B are a flow diagram illustrating an embodiment of a method for committing a proposed mutation. In some embodiments, the process of FIGS. 5A and 5B is executed using the processor of Database System 200 of FIG. 2. In various embodiments, the process of FIGS. 5A and 5B is executed in whole or in part using any appropriate combination of one or more processors. In various embodiments, the process of FIGS. 5A and 5B utilizes one or more of Interface 202, Storage 206, and Memory 208 of Database System 200 of FIG. 2.

The process flow of FIG. 5A describes a method for validating an aggregate of events prior to committing a proposed mutation to the aggregate. In 500, Input Data is received with an Included Command. For example, the Included Command comprises a request to apply the proposed mutation, which includes Input Data, to a related aggregate of events (e.g., stored within a Database System). In 502, it is determined whether the Included Command is valid. In some embodiments, determining whether the command is valid comprises determining whether the command is valid syntactically and/or whether the accompanying data are appropriate for the command including determining one or more of the following: whether the data is within range, whether the data is of appropriate data type, and/or whether the data matches command input parameters.

In response to the Included Command being determined invalid, in 504, an exception is returned, and the process ends. In response to the Included Command being determined valid, in 506, Aggregate N−1 is located within the Database System. In the example shown, Aggregate N−1 is the aggregate of events to which the proposed mutation will be applied. In 508, a Client Key ID for Aggregate N−1 is obtained. For example, the Client Key ID for Aggregate N−1 is obtained from a storage device or unit within a database system. In 510, a Client Key is retrieved using the Client Key ID. For example, a Client Key is retrieved using the Client Key ID from Storage within a Database System or from a separate secured system (e.g., a key management service). In 512, a list of Events is retrieved from Aggregate N−1. For example, Event 1 through Event N−1 is retrieved from Aggregate N−1. In 514, an Empty Aggregate N is instantiated. In some embodiments, Empty Aggregate N is an object-oriented data structure. In some embodiments, the data structure comprises a format to receive one or more events.

In 516, a Next Event is selected from Aggregate N−1 for validation. In 518, the Contents of Next Event are retrieved. For example, the contents of a Next Event such as input data, an identifier, a proposed event signature, and a prior event signature are retrieved. In 520, the Input Data and Sequence Number of Next Event are hashed with the Event Signature from Prior Event. For example, the Input Data and Sequence Number of Next Event are hashed with the Event Signature from Prior Event, wherein the prior event comprises the event immediately prior to the selected Next Event from the list of Events retrieved from Aggregate N−1 in 512. In 522, the Hash Value Output of 520 is encrypted using the Client Key to generate a Check Signature. In 524, it is determined whether the Check Signature is equivalent to the Next Event Signature. In response to the Check Signature being determined invalid, in 504, an exception is returned, and the process ends. For example, an indication or status is associated with the Next Event indicating that the Next Event is not valid, an indication is sent or logged indicating that the Next Event is not valid, the system reverts the Event data in the Aggregate to a valid state prior to the invalid event, the system regenerates the Next Event using stored input data for the Next Event, or any other appropriate action following an invalid determination. In response to the Check Signature being determined valid, in 526, the Next Event is applied onto Aggregate N. In 528, it is determined whether all Events have been validated (i.e., all the Events on the list of Events retrieved from Aggregate N−1 in 512). In response to determining that all Events have not been validated, the process flows to 516 to select a Next Event from Aggregate N−1 for validation. In response to determining that all Events have been validated, and the control passes to 530. For example, in response to all the Events on the list retrieved from Aggregate N−1 in 512 having been validated, and control passes to 530. In 530, Event Signature N−1 is tracked. For example, the Event Signature N−1 is stored in processor memory. In 532, the validated Aggregate N is provided, and control passes to (A) of FIG. 5B. For example, the validated Aggregate N is provided to processor memory for use by a computer program running on a processor in a Database System.

In the example shown in FIG. 5B, in 540, the validated Aggregate N, Client Key, and Event Signature N−1 are received. For example, the validated Aggregate N, Client Key and Event Signature N−1 are received from a memory coupled to a processor. In 542, a Proposed Event Data Structure is instantiated. In some embodiments, the Proposed Event Data Structure is an object-oriented data structure. In some embodiments, the data structure comprises a format to receive input data, an identifier, a proposed event signature, and a prior event signature. In 544, Input Data and Event Signature N−1 are applied onto the Proposed Event Data Structure. In 546, Sequence Number N is generated and applied onto the Proposed Event Data Structure. For example, a Sequence Generator generates Sequence Number N, wherein Sequence Number N is gapless, sequential to Aggregate N−1, and unique. In 548, a Hash Value is generated by hashing Input Data and Sequence Number N with Event Signature N−1. In 550, the Hash Value Output of 548 is encrypted using the Client Key to generate Event Signature N. In 552, Event Signature N is applied onto the Proposed Event Data Structure to generate the Proposed Mutation, wherein the Proposed Mutation comprises the Input Data, Sequence Number N, Event Signature N−1, and Event Signature N. In 554, the Proposed Mutation is accepted into Aggregate N. In 556, Proposed Mutation is stored in an Event Store, and the process ends. In some embodiments, the Event Store is stored within a Database System storage device.

Figure 6:
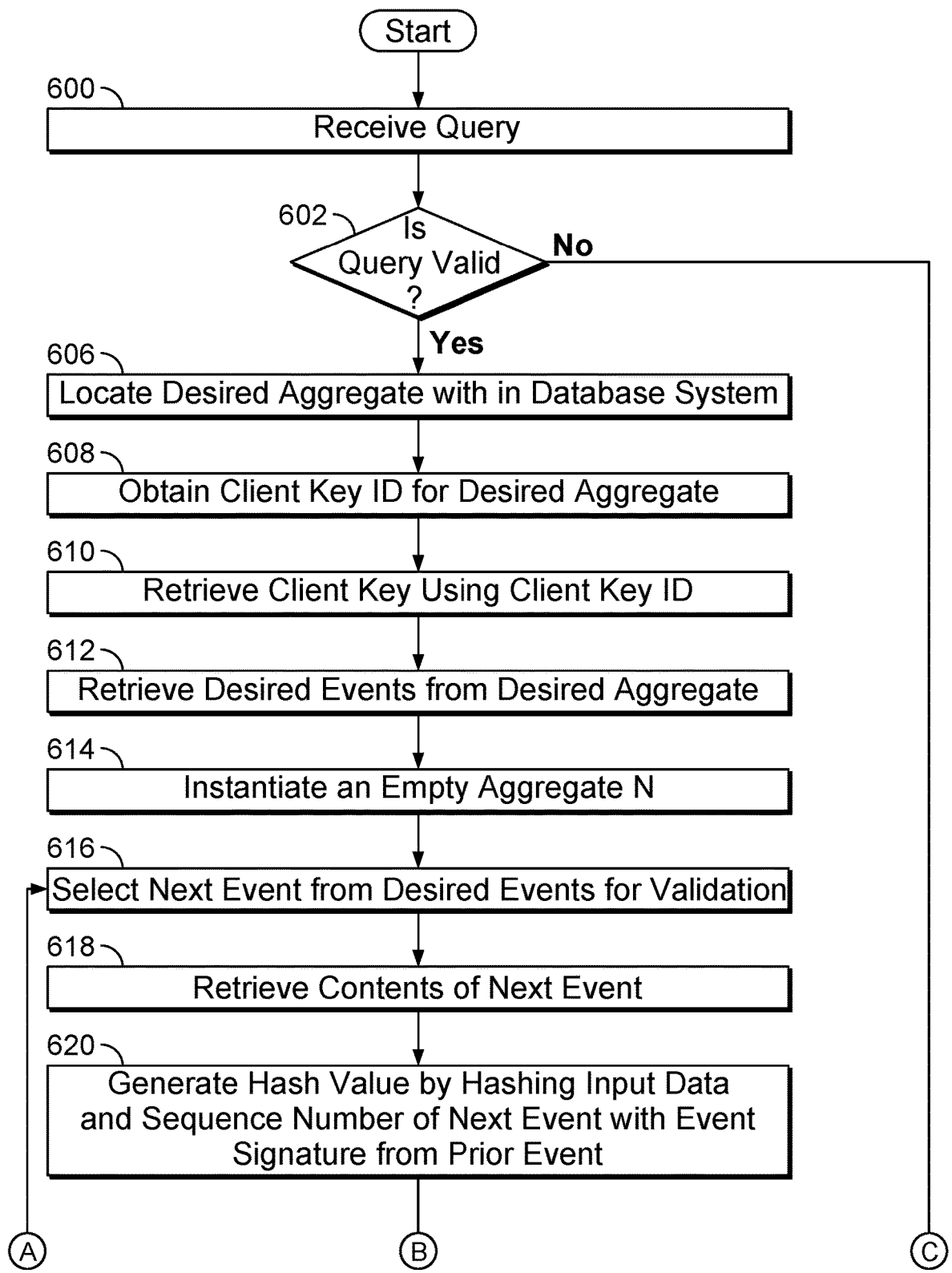
FIG. 6 is a flow diagram illustrating an embodiment of a method for generating the state of an aggregate.
Figure 6:
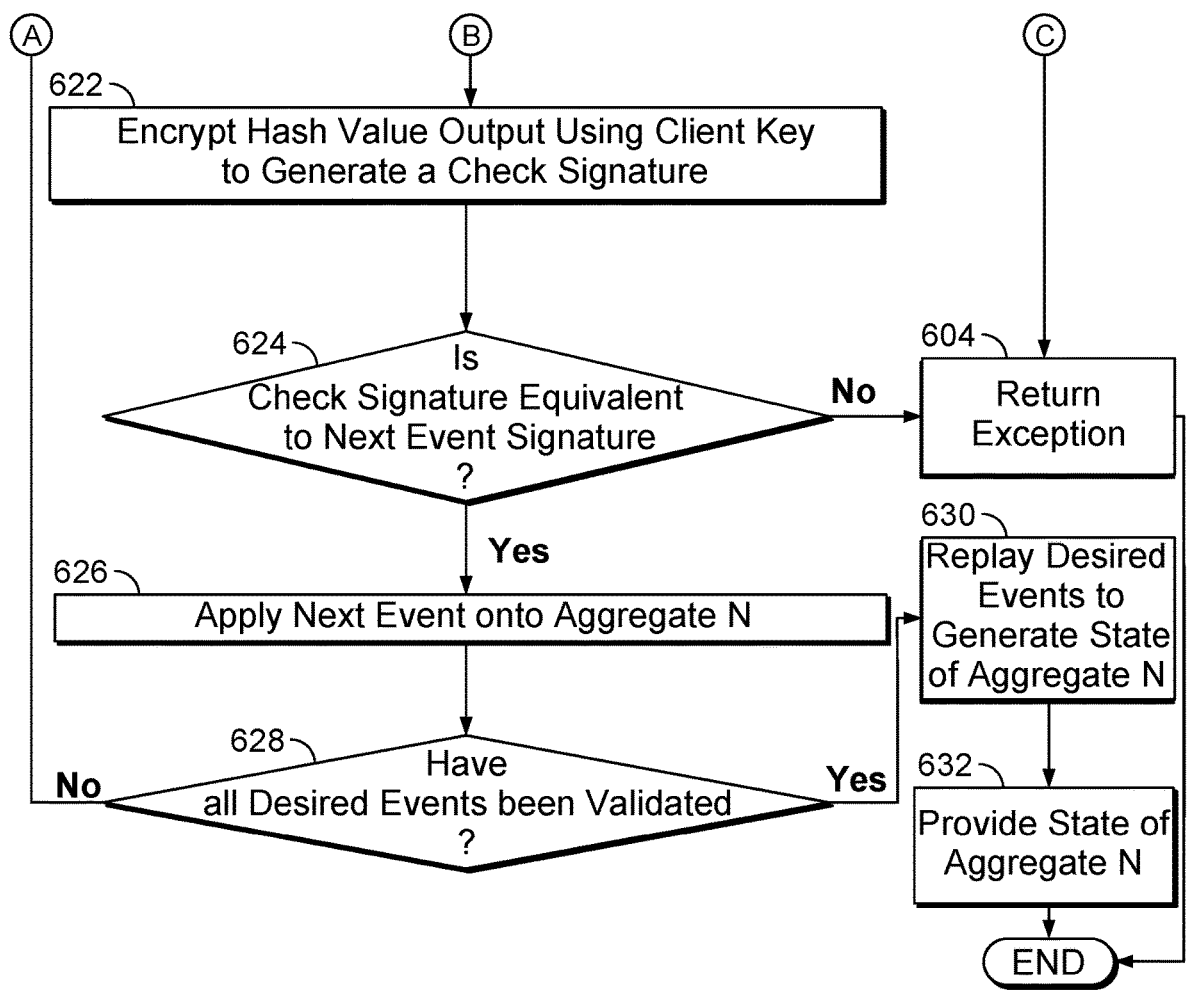

FIG. 6 is a flow diagram illustrating an embodiment of a method for generating the state of an aggregate. In some embodiments, the process of FIG. 6 is executed using the processor of Database System 200 of FIG. 2. In various embodiments, the process of FIG. 6 is executed in whole or in part using any appropriate combination of one or more processors. In various embodiments, the process of FIG. 6 utilizes one or more of Interface 202, Storage 206, and Memory 208 of Database System 200 of FIG. 2.

In 600, a Query is received. For example, a query is received to determine the state of an aggregate at a desired event that occurred at a particular date or time. In some embodiments, a Query is received to read input data from one or more events within an aggregate of events. In 602, it is determined whether the Query is valid. In various embodiments, determining whether the query is valid comprises determining whether the query is valid syntactically and/or whether the accompanying data are appropriate for the query including determining one or more of the following: whether the data is within range, whether the data is of appropriate data type, and/or whether the data matches command input parameters, or any other appropriate manner of determining whether a query is valid.

In response to the Query being determined invalid, in 604, an exception is returned, and the process ends. In response to the Query being determined valid, in 606, the Desired Aggregate is located within a Database System. In 608, a Client Key ID for the Desired Aggregate is obtained. For example, a Client Key ID for the Desired Aggregate is obtained from Storage within a Database System. In 610, a Client Key is retrieved using the Client Key ID. For example, a Client Key is retrieved using the Client Key ID from Storage within a Database System or from a separate secured system such as a key management service. In 612, the Desired Events are retrieved from the Desired Aggregate. For example, Event 1 through Event N−1 or any other desired set of events are retrieved from the desired Aggregate. In 614, an Empty Aggregate N is instantiated. In some embodiments, Empty Aggregate N is an object-oriented data structure. In some embodiments, the data structure comprises a format to receive one or more events.

In 616, a Next Event is selected from the Desired Events for validation. In 618, the Contents of Next Event are retrieved. For example, the Contents of the Next Event such as input data, an identifier, a proposed event signature, and a prior event signature are retrieved. In 620, a Hash Value is generated by hashing Input Data and Sequence Number of Next Event with Event Signature from Prior Event. For example, the Input Data and Sequence Number of Next Event are hashed with the Event Signature of the event immediately prior to the selected Next Event. In 622, the Hash Value Output of 620 is encrypted using the Client Key to generate a Check Signature. In 624, it is determined whether the Check Signature is equivalent to the Next Event Signature. In response to the Check Signature being determined invalid, in 604, an exception is returned, and the process ends. For example, an indication or status is associated with the Next Event indicating that the Next Event is not valid, an indication is sent or logged indicating that the Next Event is not valid, the system reverts the Event data in the Aggregate to a valid state prior to the invalid event, the system regenerates the Next Event using stored input data for the Next Event, or any other appropriate action following an invalid determination.

In response to the Check Signature being determined valid, in 626, the Next Event is applied onto Aggregate N. In 628, it is determined whether all Desired Events have been validated. In response to determining that all Desired Events have not been validated, the process flows to 616 to select a Next Event from the Desired Events for validation. In response to determining that all Desired Events have been validated, the process flows to 630. In 630, the Desired Events are replayed to generate the state of Aggregate N. In some embodiments, wherein a Query comprises a request to read input data from one or more events within an aggregate of events, 630 is omitted.

In 632, the state of Aggregate N is provided, and the process ends. For example, the state of Aggregate N is provided to a user of a Client or an Application Development System. In some embodiments, wherein a Query comprises a request to read input data from one or more events within an aggregate of events.

Figure 7:
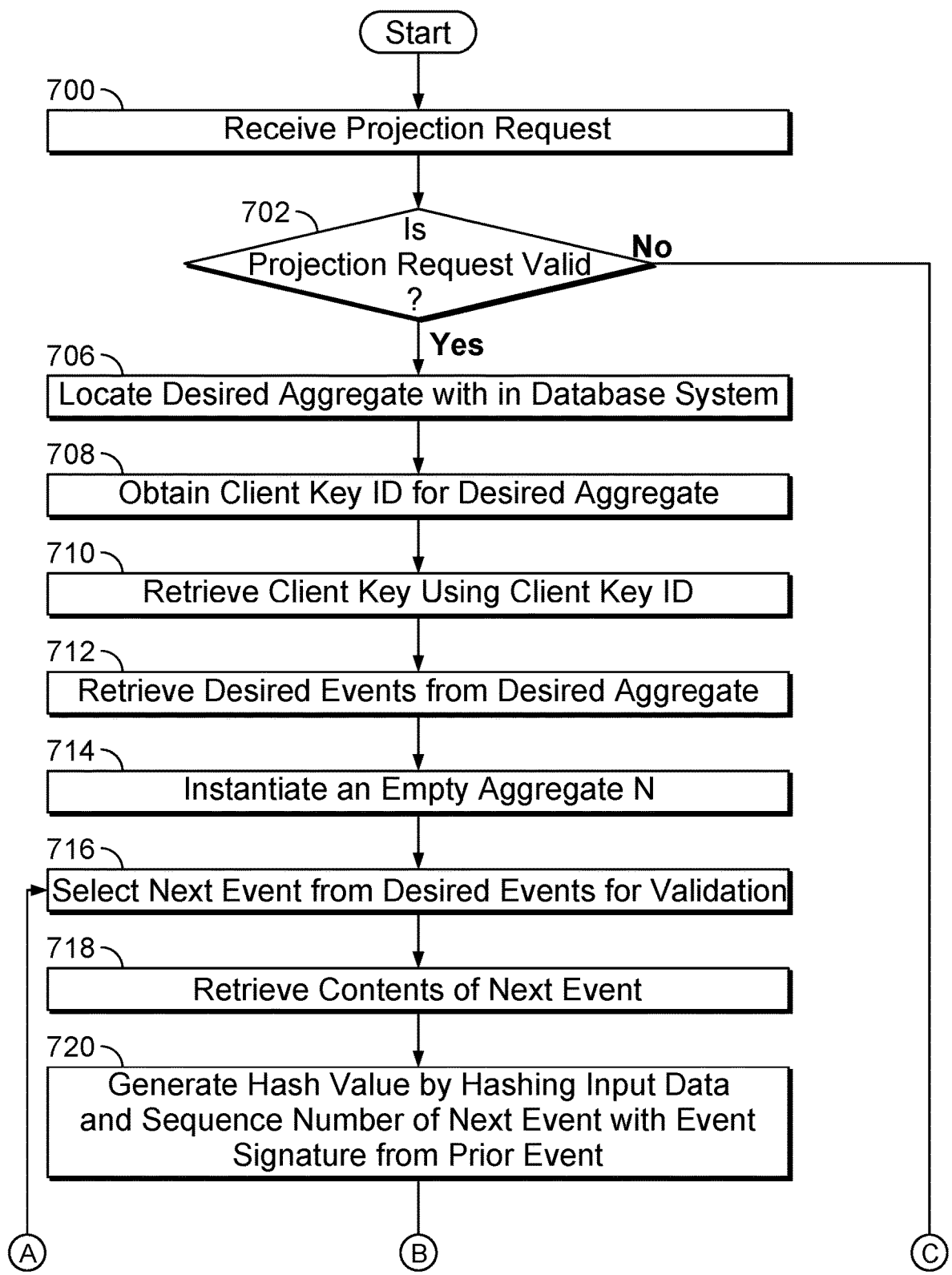
FIG. 7 is a flow diagram illustrating an embodiment of a method for generating a projection.
Figure 7:
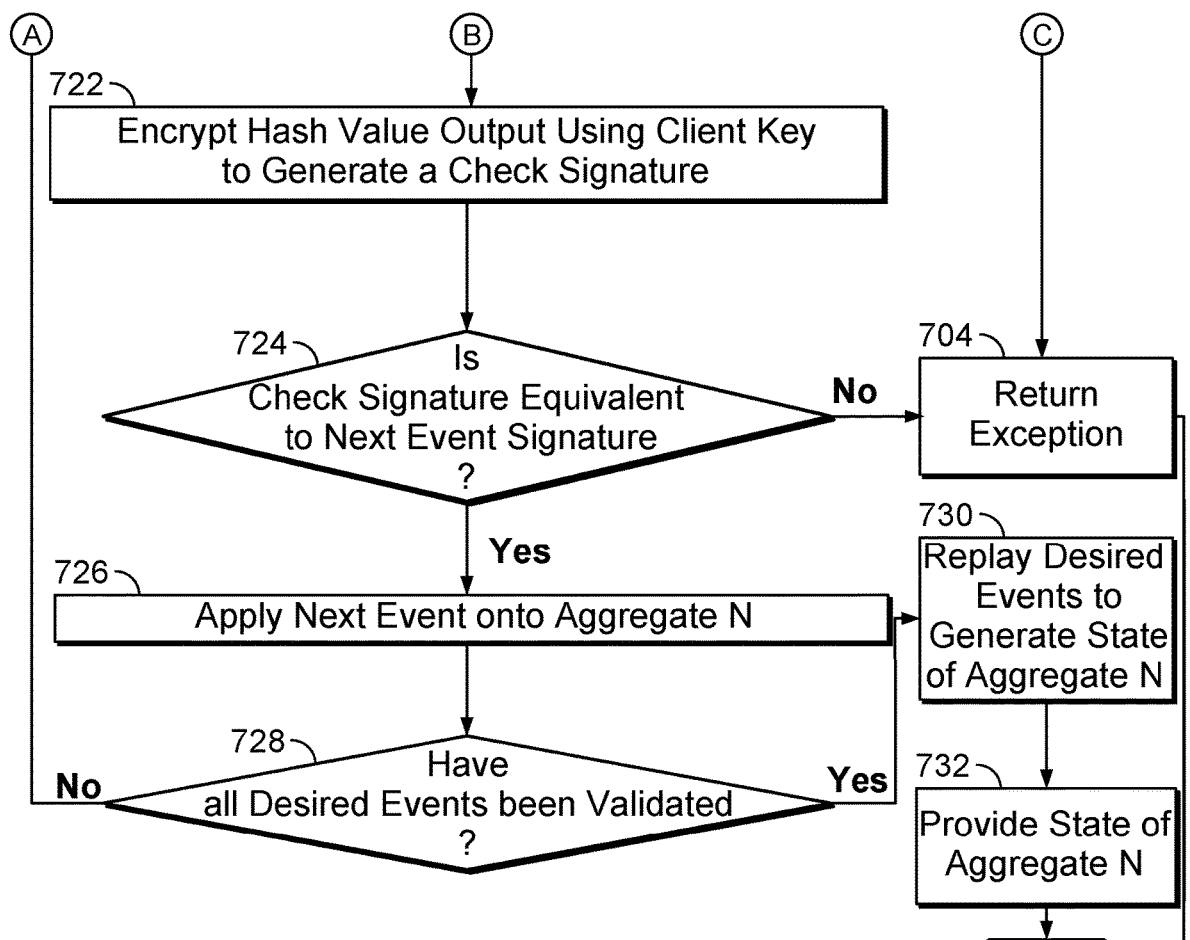

FIG. 7 is a flow diagram illustrating an embodiment of a method for generating a projection. In some embodiments, the process of FIG. 7 is executed using the processor of Database System 200 of FIG. 2. In various embodiments, the process of FIG. 7 is executed in whole or in part using any appropriate combination of one or more processors. In various embodiments, the process of FIG. 7 utilizes one or more of Interface 202, Storage 206, and Memory 208 of Database System 200 of FIG. 2.

In 700, a Projection Request is received. For example, a projection request is received to determine the state of an aggregate at a desired event that occurred at a particular date or time. In 702, it is determined whether the Projection Request is valid. In some embodiments, determining whether the projection request is valid comprises determining whether the projection request is valid syntactically and/or whether the accompanying data are appropriate for the projection request including determining one or more of the following: whether the data is within range, whether the data is of appropriate data type, and/or whether the data matches command input parameters.

In response to the Projection Request being determined invalid, in 704, an exception is returned, and the process ends. In response to the Projection Request being determined valid, in 706, the Desired Aggregate is located within a Database System. In 708, a Client Key ID for the Desired Aggregate is obtained. For example, a Client Key ID for the desired aggregate is obtained from Storage within a Database System. In 710, a Client Key is retrieved using the Client Key ID. For example, a Client Key is retrieved using the Client Key ID from Storage within a Database System or from a separate secured system such as a key management service. In 712, the Desired Events are retrieved from the Desired Aggregate. For example, Event 1 through Event N−1, or any other desired set of events are retrieved from the Desired Aggregate. In 714, an Empty Aggregate N is instantiated. In some embodiments, Empty Aggregate N is an object-oriented data structure. In some embodiments, the data structure comprises a format to receive one or more events.

In 716, a Next Event is selected from the Desired Events for validation. In 718, the Contents of Next Event are retrieved. For example, contents of a Next Event such as input data, an identifier, a proposed event signature, and a prior event signature are retrieved. In 720, a Hash Value is generated by hashing Input Data and Sequence Number of Next Event with Event Signature from Prior Event. For example, the Input Data and Sequence Number of the Next Event are hashed with the Event Signature of the event immediately prior to the selected Next Event. In 722, the Hash Value Output of 620 is encrypted using the Client Key to generate a Check Signature. In 724, it is determined whether the Check Signature is equivalent to the Next Event Signature. In response to the Check Signature being determined invalid, in 704, an exception is returned, and the process ends. For example, an indication or status is associated with the Next Event indicating that the Next Event is not valid, an indication is sent or logged indicating that the Next Event is not valid, the system reverts the Event data in the Aggregate to a valid state prior to the invalid event, the system regenerates the Next Event using stored input data for the Next Event, or any other appropriate action following an invalid determination.

In response to the Check Signature being determined valid, in 726, the Next Event is applied onto Aggregate N. In 728, it is determined whether all Desired Events have been validated. In response to determining that all Desired Events have not been validated, the process flows to 716 to select a Next Event from the Desired Events for validation. In response to determining that all Desired Events have been validated, the process flows to 730. In 730, the Desired Events are replayed to generate the state of Aggregate N (i.e., the state of Aggregate N up to the point of the Desired Event). In 732, the state of Aggregate N is stored in a Projection Store, and the process ends.

Figure 8A:
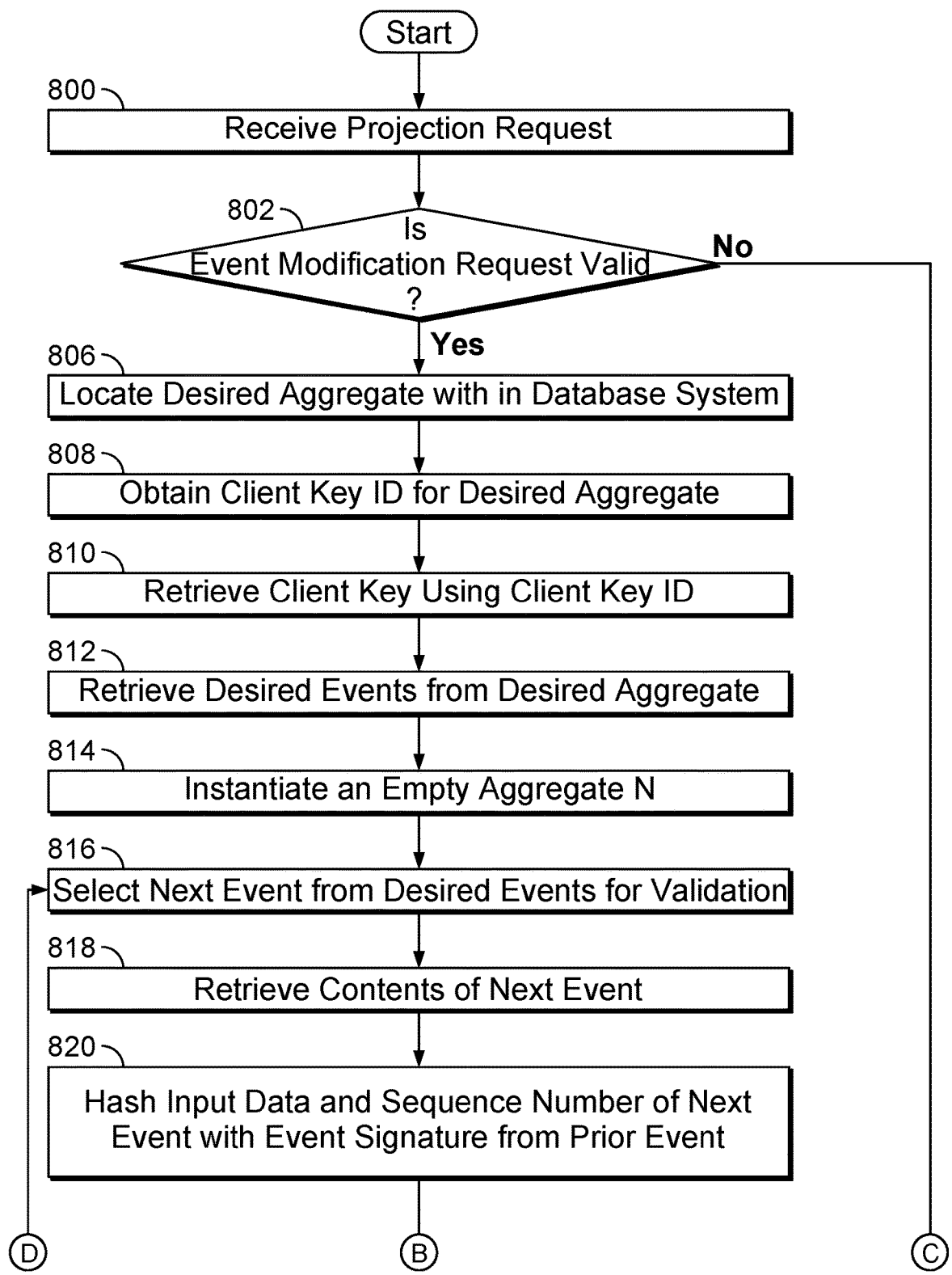
FIGS. 8A and 8B are a flow diagram illustrating an embodiment of a method for modifying an event.
Figure 8A:
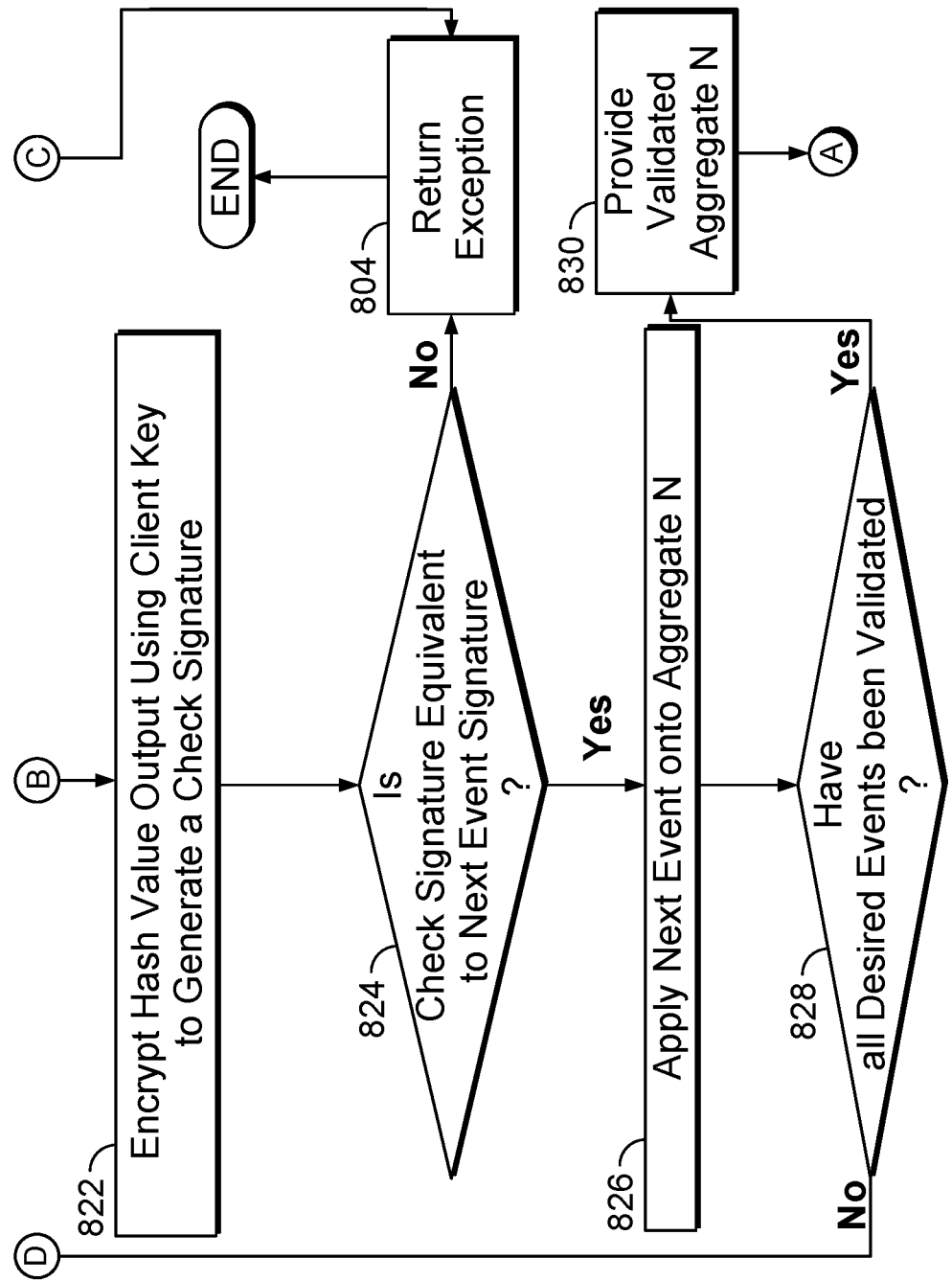
Figure 8B:
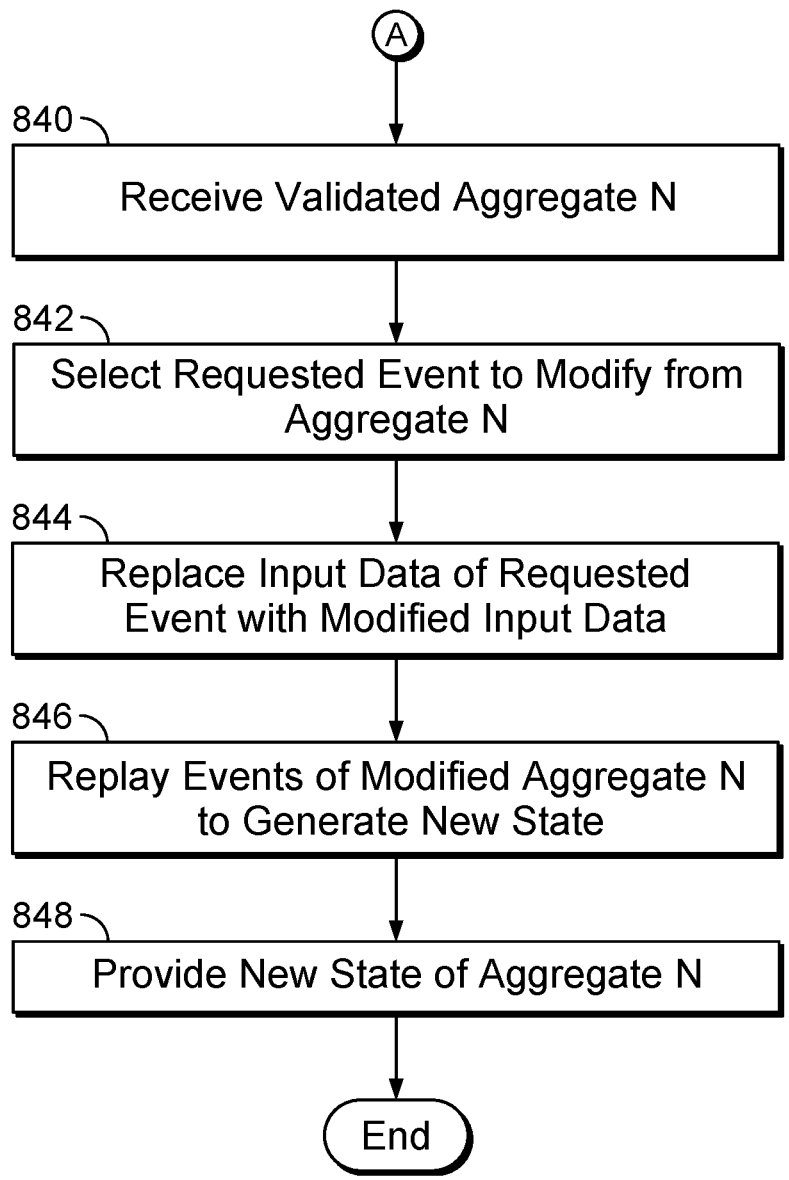

FIGS. 8A and 8B are a flow diagram illustrating an embodiment of a method for modifying an event. In some embodiments, the process of FIGS. 8A and 8B is executed using the processor of Database System 200 of FIG. 2. In various embodiments, the process of FIGS. 8A and 8B is executed in whole or in part using any appropriate combination of one or more processors. In various embodiments, the process of FIGS. 8A and 8B utilizes one or more of Interface 202, Storage 206, and Memory 208 of Database System 200 of FIG. 2.

The process flow of FIG. 8A describes a method for validating an aggregate of events prior to modifying an event. In 800, Modified Input Data and an Event Modification Request are received. For example, Modified Input Data and an Event Modification Request are received to modify the state of an aggregate at a desired event (e.g., an event that occurred at a particular date or time). This can be helpful for hypothetical scenario modeling or to understand the impact of a bug or flaw in the system.

In 802, it is determined whether the Event Modification Request is valid. In some embodiments, determining whether the event modification request is valid comprises determining whether the event modification request is valid syntactically and/or whether the accompanying data are appropriate for the event modification request including determining one or more of the following: whether the data is within range, whether the data is of appropriate data type, and/or whether the data matches command input parameters.

In response to the Event Modification Request being determined invalid, in 804, an exception is returned, and the process ends. In response to the Event Modification Request being determined valid, in 806, the Desired Aggregate is located within a Database System. In 808, a Client Key ID for the Desired Aggregate is obtained. In some embodiments, the Client Key ID is obtained from Storage within a Database System. In 810, a Client Key is retrieved using the Client Key ID. For example, The Client Key is retrieved using the Client Key ID from Storage within a Database System or from a separate secured system (e.g., a key management service). In 812, the Desired Events are retrieved from the Desired Aggregate. For example, Event 1 through Event N−1, or any other desired set of events are retrieved. In 814, an Empty Aggregate N is instantiated. In some embodiments, Empty Aggregate N is an object-oriented data structure. In some embodiments, the data structure comprises a format to receive one or more events.

In 816, a Next Event is selected from the Desired Events for validation. In 818, the Contents of Next Event are retrieved. For example, content comprising input data, an identifier, a proposed event signature, and a prior event signature are retrieved. In 820, a Hash Value is generated by hashing Input Data and Sequence Number of Next Event with Event Signature from Prior Event. In some embodiments, the prior event comprises the event immediately prior to the selected Next Event. In 822, the Hash Value Output of 820 is encrypted using the Client Key to generate a Check Signature. In 824, it is determined whether the Check Signature is equivalent to the Next Event Signature. In response to the Check Signature being determined invalid, in 804, an exception is returned, and the process ends. For example, an indication or status is associated with the Next Event indicating that the Next Event is not valid, an indication is sent or logged indicating that the Next Event is not valid, the system reverts the Event data in the Aggregate to a valid state prior to the invalid event, the system regenerates the Next Event using stored input data for the Next Event, or any other appropriate action following an invalid determination.

In response to the Check Signature being determined valid, in 826, the Next Event is applied onto Aggregate N. In 828, it is determined whether all Desired Events have been validated. In response to determining that all Desired Events have not been validated, the process flows to 816 to select a Next Event from the Desired Events for validation. In response to determining that all Desired Events have been validated, the process flows to 830. In 830, the validated Aggregate N is provided, and control passes to 840. For example, the validated Aggregate N is provided to processor memory for use by a computer program.

The process flow of FIG. 8B describes a method for modifying an event within the validated Aggregate N. In 840, the validated Aggregate N is received. For example, the validated Aggregate N is received from storage in a memory. In 842, the requested Event to Modify is selected from Aggregate N. In 844, the Input Data of the Requested Event is replaced with Modified Input Data. For example, Modified Input Data comprises a different financial transaction than what was actually transacted in order to assess the impact of the different transaction on the aggregate's state (e.g., as part of a 'what-if' analysis).

In 846, the Events of Modified Aggregate N are replayed. For example, the events of the Modified Aggregate N are replayed to generate a New State (i.e., the state of Aggregate N comprising the Desired Events but with the Modified Input Data replacing the original input data of the requested Event to Modify). In 848, the New State of Aggregate N is provided, and the process ends. For example, the New State of Aggregate N is provided to a user of a Client or an Application Development System.

Figure 9:
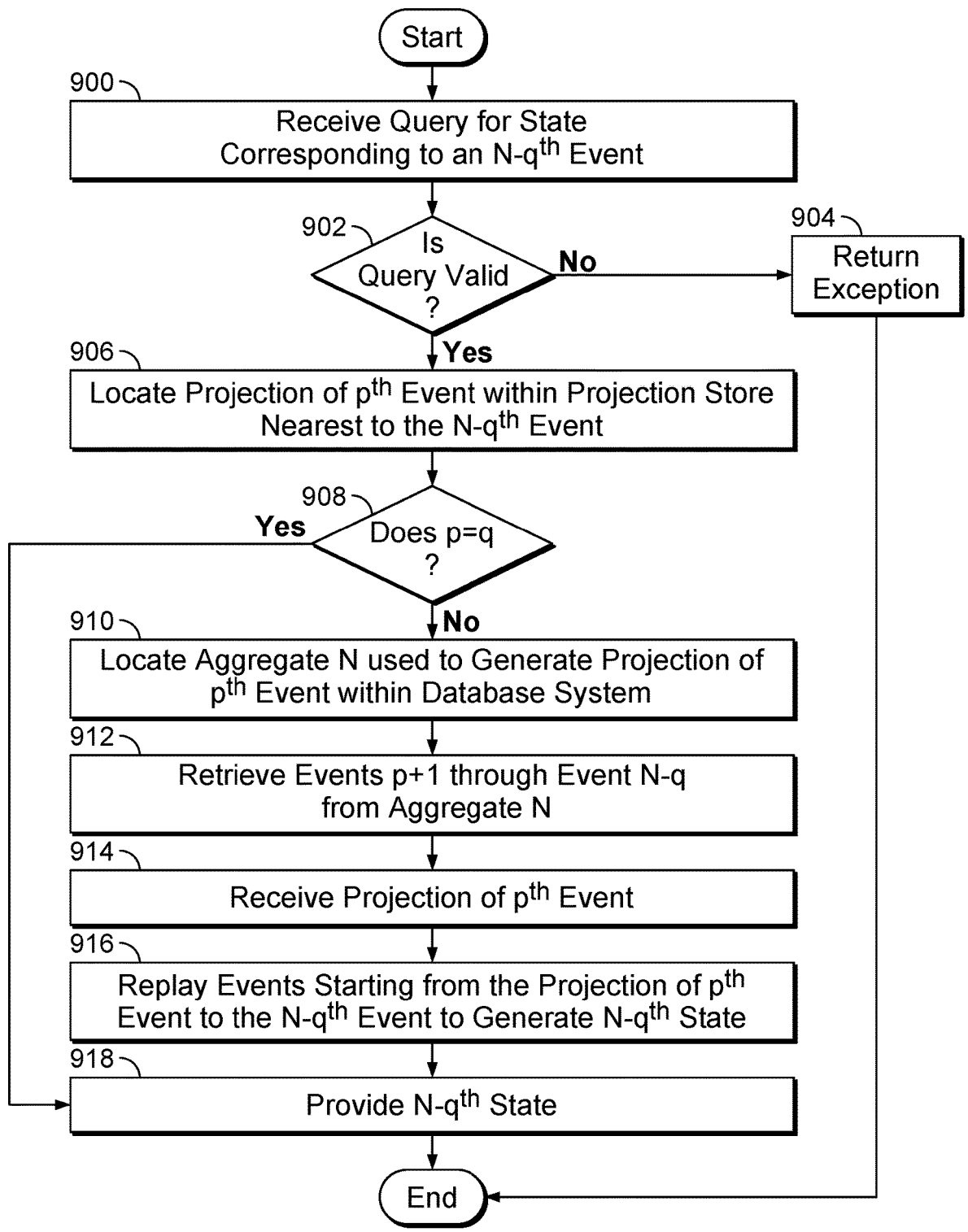
FIG. 9 is a flow diagram illustrating an embodiment of a method for generating the state of an aggregate using a projection.

FIG. 9 is a flow diagram illustrating an embodiment of a method for generating the state of an aggregate using a projection. In some embodiments, the process of FIG. 9 is executed using the processor of Database System 200 of FIG. 2. In various embodiments, the process of FIG. 9 is executed in whole or in part using any appropriate combination of one or more processors. In various embodiments, the process of FIG. 9 utilizes one or more of Interface 202, Storage 206, and Memory 208 of Database System 200 of FIG. 2.

In 900, a Query is received for the State corresponding to an N-$q^{th}$ Event, wherein q is an integer value ranging from 0 to N−1. For example, a query is received to determine the state of an aggregate at a desired event that corresponds to the N-$q^{th}$ Event (e.g., an event that occurred at a particular date or time). In 902, it is determined whether the Query is valid. In some embodiments, determining whether the query is valid comprises determining whether the query is valid syntactically and/or whether the accompanying data are appropriate for the query including determining one or more of the following: whether the data is within range, whether the data is of appropriate data type, and/or whether the data matches command input parameters.

In response to the Query being determined invalid, in 904, an exception is returned, and the process ends. In response to the Query being determined valid, in 906, the Projection of a $p^{th}$ Event within a Projection Store that is nearest to the N-$q^{th}$ Event is located, wherein p is an integer value ranging from 1 to N. For example, a processor (e.g., a processor within a Database System) runs a computer program that searches the Projection Store for an event that is closest in date and time to the N-$q^{th}$ Event. In some embodiments, the computer program searches using sequence number identifiers associated with each projection in the Projection Store. In some embodiments, the computer program references a look-up table (e.g., stored in the Projection Store, stored in another storage device within a Database System, or stored in any other appropriate location) to determine which sequence number corresponds to a projection that is closest to the N-$q^{th}$ Event. In various embodiments, the look-up table is updated each time a projection is added to the Projection Store, or at any other appropriate interval. For example, a record of the sequence number corresponding to the projected event is added to the look-up table when a projected state of an aggregate is added to the Projection Store.

In response to locating the $p^{th}$ event within the Projection Store, in 908, it is determined whether p equals q. For example, it is determined whether the projection of the aggregate's state at the $p^{th}$ Event corresponds to the requested N-$q^{th}$ Event. In response to determining that p equals q, in 918, the N-$q^{th}$ State is provided, and the process ends. For example, the N-qth state is provided to a user of a Client or an Application Development System.

In response to determining that p does not equal q, in 910, the Aggregate N that was used to generate the Projection of the $p^{th}$ Event is located within the Database System. For example, a processor (e.g., a processor within a Database System) runs a computer program that searches the Database System for an aggregate that corresponds to the N-$q^{th}$ Event. In some embodiments, the computer program searches using sequence number identifiers associated with each aggregate in the Database System. In some embodiments, the computer program references a look-up table (e.g., stored within the Database System, or in any other appropriate location) to determine which sequence number corresponds to the aggregate that was used to generate the Projection of the $p^{th}$ Event (i.e., Aggregate N).

In response to locating Aggregate N, Events p+1 through Event N-q from Aggregate N are retrieved. In 914, the Projection of the $p^{th}$ Event is received. For example, the Projection of the $p^{th}$ Event is received in processor memory for use by a computer program (e.g., a computer program running on a processor in a Database System). In 916, Events starting from the Projection of $p^{th}$ Event to the N-$q^{th}$ Event are replayed to generate the N-$q^{th}$ State. For example, the Events are replayed by a computer program running on a processor in a Database System. In 918, the N-$q^{th}$ State is provided, and the process ends. For example, the N-$q^{th}$ State of Aggregate N is provided to a user of a Client or an Application Development System.

Figure 10:
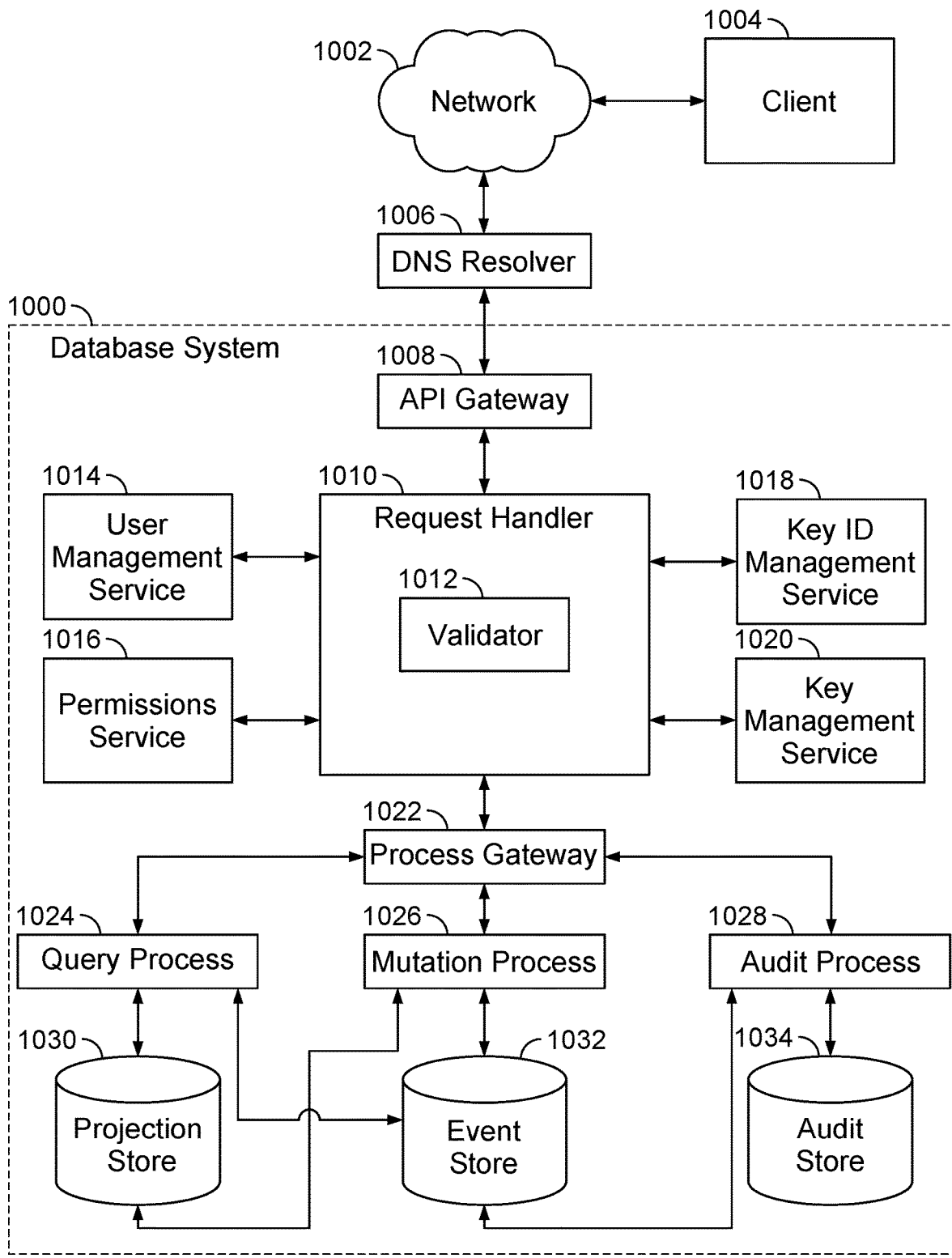
FIG. 10 is a block diagram illustrating an embodiment of a system for aggregating, auditing, and committing event data; for querying the state of an aggregate; and for creating and writing a projection.

FIG. 10 is a block diagram illustrating an embodiment of a system for aggregating, auditing, and committing event data; for querying the state of an aggregate; and for creating and writing a projection. In various embodiments, Database System 1000, Network 1002, and/or Client 1004 correspond respectively to Database System 100, Network 102, and/or Client 104 of FIG. 1. In various embodiments, Database System 1000 comprises an alternate implementation of Database System 200 of FIG. 2. In some embodiments, Database System 1000 is curated by one or more third parties that provide services to the Client (i.e., one or more service providers) comprising the capabilities enabled by the system of FIG. 10.

In the example shown, Database System 1000 is connected to Client 1004 via DNS Resolver 1006 and Network 1002. DNS Resolver 1006 is a Domain Name System (DNS) (e.g., a server) used to resolve and route HTTP requests (e.g., from Client 1004) to the appropriate API Gateway (e.g., API Gateway 1008). In some embodiments, DNS Resolver 1006 resides within Network 1002 (e.g., as part of a cloud-based service provider). In some embodiments, DNS Resolver 1006 is hosted by a server (e.g., a virtual server) external to Network 1002 (e.g., as provided by an external service provider). In various embodiments, DNS Resolver 1006 comprises a recursive resolver, a root nameserver, a top-level domain nameserver, an authoritative nameserver, and/or any other appropriate type of nameserver.

Network 1002 comprises a communication network. In various embodiments, Network 1002 comprises wired and/or wireless communication networks comprising standard, hybrid, and/or proprietary networks (e.g., a local area network, a wide area network, a virtual private network, etc.), proxy servers, and data centers. In some embodiments, Network 1002 comprises a Content Distribution Network. In some embodiments, Network 1002 comprises components of a cloud computing platform—for example, comprising a front end platform (e.g., a fat client, a thin client, etc.), a back end platform (e.g., servers, data storage, etc.), a cloud based delivery, and a network (e.g., Internet, Intranet, Intercloud, etc.).

In the example shown, Database System 1000 comprises API Gateway 1008, Request Handler 1010, User Management Service 1014, Permissions Service 1016, Key ID Management Service 1018, Key Management Service 1020, Process Gateway 1022, Query Process 1024, Mutation Process 1026, Audit Process 1028, Projection Store 1030, Event Store 1032, and Audit Store 1034. In various embodiments, computer programs used to execute the services provided by the system of FIG. 10 are executed in whole or in part using one or more processors (e.g., one or more processors of API Gateway 1008, Request Handler 1010, User Management Service 1014, Permissions Service 1016, Key ID Management Service 1018, Key Management Service 1020, Process Gateway 1022, Query Process 1024, Mutation Process 1026, and Audit Process 1028).

API Gateway 1008 manages communications between Request Handler 1010 and Client 1004. For example, API Gateway 1008 comprises a server that acts as an API front-end, receives API requests, enforces throttling and security policies, passes requests to Request Handler 1010, and passes a response from Query Process 1024, Mutation Process 1026, and/or Audit Process 1028 via Process Gateway 1022 and Request Handler 1010 back to Client 1004. In various embodiments, API Gateway 1008 supports authentication, authorization, security, audit, and/or regulatory compliance.

The system of FIG. 10 supports requests from Client 1004 (e.g., HTTP requests) comprising query requests (e.g., for one or more events, for an aggregate of events at the moment, for an aggregate of events at some time in the past, for the state of an aggregate, etc.), mutation requests (e.g., to persist an event, to append an event to an existing aggregate, to assess the impact of a different transaction on the aggregate's state, etc.), and/or writing, checking and/or reading one or more projections.

The system provides responses to Client 1004 by utilizing Query Process 1024, Mutation Process 1026, and/or Audit Process 1028. Query Process 1024, Mutation Process 1026, and Audit Process 1028 comprise software programs executing on a processor—for example, Client APIs generated by an Application Development System (e.g., Application Development System 106 of FIG. 1). Request Handler 1010 routes the Client Request to the applicable process via Process Gateway 1022. In various embodiments, Query Process 1024, Mutation Process 1026, and Audit Process 1028 run on one or more processors within or external to Database System 1000, or any appropriate combination of one or more processors.

In some embodiments, the Client Request includes an access token (e.g., a primary token or an impersonation token) within a request header. In various embodiments, the access token includes security credentials for a login session and identifies the user, the user's groups, and/or the user's privileges. Request Handler 1010 makes a request to User Management Service 1014 to validate the access token. In response to the token being valid, User Management Service 1014 responds with the Requestor's identity information. Request Handler 1010 uses the identity information to obtain permission levels associated with the Requestor from Permissions Service 1016. In response to valid permission levels, Request Handler 1010 requests a Key ID (e.g., the Client Key) from Key ID Management Service 1018. In response to receiving the Key ID, Request Handler 1010 requests the Client Key from Key Management Service 1020 using the obtained Key ID.

Validator 1012 performs basic validation of the Client Request, wherein determining whether the request is valid comprises determining whether the request is valid syntactically and/or whether data included with the request is appropriate for the request including determining one or more of the following: whether the data is within range, whether the data is of appropriate data type, and/or whether the data matches the requested input parameters. In some embodiments, the validations of validator 1012, query process 1024, mutation process 1026, and audit process 1028 serve the same purpose: to check whether the query/mutation/audit request is appropriate before continuing to do any logic. The system can immediately short-circuit the process when it is determined that there is an invalid request, rather than trying to continue the request and realize an issue later. These validations can be thought of in two ways: (1) generic request checking and (2) custom business logic checking. The first is something that can determine across ALL requests, like if the request is well-formed and parsable. The latter is something that each implementation of this system will customize to fit its specific needs, like whether the criteria for a query request makes sense in the business context (e.g., the request tries to set a price to a negative value, the query is for data in a date range that is too wide, etc.). The distinction between the checking at validator 1012 and the checking at query process 1024, mutation process 1026, and audit process 1028 is solely that, for a query, the system is checking that the query is valid, for a mutation, the system is checking that what is about to change is valid, and for audit, that the system is checking that what is being audited is valid. In some embodiments, Validator 1012 performs sanitization of the input data, wherein sanitization comprises removing data (e.g., hypertext markup language (HTML) tags or special character sequences) that might be misinterpreted as computer instructions or database queries, and/or removing any other unnecessary data that may leave the system vulnerable to unauthorized access and/or manipulation of data—for example, via an SQL (Structured Query Language) injection attack.

In response to a valid and/or sanitized request, Request Handler 1010 routes the Request, along with the Client Key to the specific Process (i.e., Query Process 1024, Mutation Process 1026, or Audit Process 1028), based on the operations required to fulfill the Client Request.

Query Process 1024 provides the requested information to Client 1004 using data stored in Projection Store 1030 and/or Event Store 1032. In some embodiments, Query Process 1024 performs query-specific validation based on input data from Client 1004's request, wherein determining whether the request is valid comprises determining whether the request is valid syntactically and/or whether data included with the request is appropriate for the request including determining one or more of the following: whether the data is within range, whether the data is of appropriate data type, and/or whether the data matches the requested input parameters. In response to the query-specific validation failing, the process indicates that the request is invalid and the query process is ended.

Mutation Process 1026 applies applicable mutation business logic to the requested aggregate to produce a new Event N and new Aggregate N (e.g., as part of a 'what-if' analysis), persists Event N to Event Store 1032, serializes Aggregate N to a storage-writable format (e.g., binary, JSON (JavaScript Object Notation), etc.), and writes Aggregate N, along with related identifying and encryption data, to Projection Store 1030. In some embodiments, Mutation Process 1026 performs mutation-specific validation based on input data from Client 1004's request, wherein determining whether the request is valid comprises determining whether the request is valid syntactically and/or whether data included with the request is appropriate for the request including determining one or more of the following: whether the data is within range, whether the data is of appropriate data type, and/or whether the data matches the requested input parameters. In response to the mutation-specific validation failing, the process indicates that the request is invalid and the mutation process is ended.

Audit Process 1028 aggregates event data from Event Store 1032 and/or Audit Store 1034, as applicable, and responds with the requested information back to Client 1004. In some embodiments, Audit Process 1028 performs audit-specific validation based on input data from Client 1004's request, wherein determining whether the request is valid comprises determining whether the request is valid syntactically and/or whether data included with the request is appropriate for the request including determining one or more of the following: whether the data is within range, whether the data is of appropriate data type, and/or whether the data matches the requested input parameters. In response to the audit-specific validation failing, the process indicates that the request is invalid and the audit process is ended.

In response to discovering a problem with the requested data or action (e.g., a corrupted aggregate/event pair, an audit that fails validation, a command that is syntactically invalid, etc.), the system in various embodiments provides an alert to Client 1004, provides an alert to a curator (not shown) of Database System 1000 (e.g., via Network 1002), and/or persists a new database record that documents the issue into Audit Store 1034.

Figure 11:
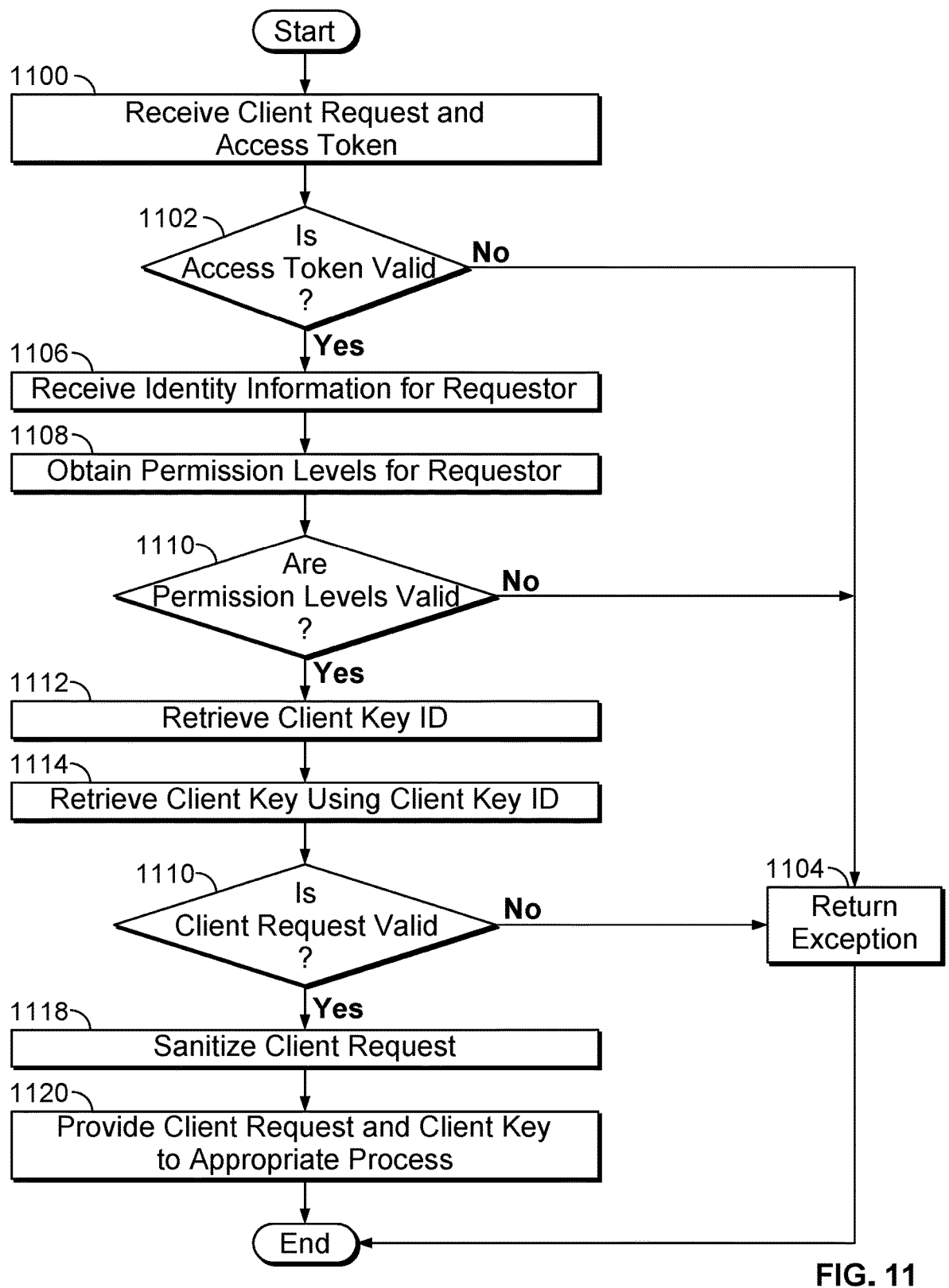
FIG. 11 is a flow diagram illustrating an embodiment of a method for receiving and validating a client request.

FIG. 11 is a flow diagram illustrating an embodiment of a method for receiving and validating a client request. In some embodiments, the process of FIG. 11 is executed by the system of FIG. 10.

In the example shown, in 1100, a Client Request and Access Token are received. For example, a client makes a request via a Network (e.g., using HTTP) that is routed (e.g., via a DNS Resolver and an API Gateway) to an appropriate tenanted endpoint (e.g., the Database System curated by the Client's service provider). The Access Token is used to uniquely identify a user and look up their entitlements based on request context. The Access Token is created when the User itself is created and stored in our system. Upon the User authenticating with their username/password, the system replies to a successful authentication with the Access Token. The Access Token is then stored on the client for use in future API calls. When an API Request is made, the system will validate the Access Token, look up the User, look up the User's Entitlements, and verify that the User's Entitlements include the Permission that secures the API Request itself. In various embodiments, the Access Token includes security credentials for a login session and identifies the user (i.e., the requestor), the user's groups, and/or the user's privileges. In various embodiments, the Access Token comprises a delegation or impersonation token that is validated by a security program running on a processor (e.g., an API Gateway server processor and/or a Request Handler processor). In some embodiments, the Client Request includes the Access Token as supplemental data placed at the beginning of the Client Request (i.e., as a header to one or more data blocks comprising the Client Request).

In 1102, it is determined whether the Access Token is valid. For example, in response to the API Gateway server validating the API Token portion of the Access Token, the API Gateway server routes the Client Request to an appropriate Request Handler. The Request Handler uses the Client Request and Access Token to make a request to a User Management Service to further validate the Access Token. In response to the Access Token being further validated, the User Management Service obtains Client identity information (e.g., requestor or user identity information) based on data within the Client Request and/or Access Token In response to any portion of the Access Token failing to validate, control passes to 1104. In 1104, an Exception is returned, and the process ends. For example, the service provider is notified (e.g., via log, email, etc.) and an unsuccessful response is returned to the Client (e.g., a message stating that the Access Token failed to validate, and/or including an error code, or any other appropriate information).

In response to the Access Token being fully validated, control passes to 1106. In 1106, identity information for the requestor is received. For example, identity information for the requestor is received by the Request Handler from the User Management Service. In some embodiments, the requestor is one of multiple possible users or requestors that work for the Client.

In 1108, Permission Levels are obtained for the Requestor. For example, the Request Handler uses identity information received from the User Management Service to obtain user Permission Levels from a Permissions Service. User Permission Levels are claims that allow or disallow user access to performing certain activities (e.g., retrieving keys from a key management service, accessing various databases, etc.).

In 1110, it is determined whether the Permission Levels are valid. For example, the Request Handler determines whether Permission Levels for the requestor are valid (e.g., by determining if the requestor has the appropriate level of authority to access the information requested in the Client Request).

In response to the Permission Levels failing to validate, control passes to 1104. In 1104, an Exception is returned, and the process ends. For example, the service provider is notified (e.g., via log, email, etc.) and an unsuccessful response is returned to the Client (e.g., a message stating that the requestor does not have permission to access the requested information, and/or including an error code, or any other appropriate information).

In response to the Permission Levels being determined as valid, control passes in 1112. In 1112, the Client Key ID is retrieved. For example, the Request Handler requests and retrieves the Client Key ID from a Key ID Management Service. In some embodiments, the Key ID Management Service provides a secure look-up for Key given a Key ID.

In 1114, the Client Key is retrieved using the Client Key ID. For example, the Request Handler requests and retrieves the Client Key from a Key Management Service using the obtained Client Key ID.

In 1116, it is determined whether the Client Request is valid. For example, the Request Handler performs basic input validation based on data within the Client Request. In various embodiments, the Request Handler relies on a dedicated Validator process or processor (e.g., a sub-process and/or a sub-processor) to perform the basic input validation, wherein determining whether the request is valid comprises whether the request is valid syntactically and/or whether data included with the request is appropriate for the request including determining one or more of the following: whether the data is within range, whether the data is of appropriate data type, and/or whether the data matches the requested input parameters.

In response to the Client Request failing to validate, control passes to 1104. In 1104, an Exception is returned, and the process ends. For example, the service provider is notified (e.g., via log, email, etc.) and an unsuccessful response is returned to the Client (e.g., a message stating that the Client Request failed to validate, and/or including an error code, or any other appropriate information).

In response to the Client Request being determined as valid, control passes to 1118. In 1118, the Client Request is sanitized. For example, the Request Handler performs basic sanitization of the input data within the Client Request. In various embodiments, the Request Handler relies on a dedicated Validator process or processor (e.g., a sub-process and/or a sub-processor) to sanitize the input data, wherein sanitization comprises removing data (e.g., hypertext markup language (HTML) tags or special character sequences) that might be misinterpreted as computer instructions or database queries, and/or removing any other unnecessary data that may leave the system vulnerable to unauthorized access and/or manipulation of data—for example, via an SQL (Structured Query Language) injection attack.

In 1120, the Client Request and Client Key are provided to the Appropriate Process, and the process ends. For example, the Request Handler routes the Client Request and Client Key to a specific processor (e.g., one or more processors supporting a Query Process, Mutation Process, and/or Audit Process), based on the nature of the requested operation within the Client Request (e.g., a query request, a mutation request, an audit request, etc.). In some embodiments, the Request Handler routes the Client Request and Client Key to the appropriate processor via a Process Gateway. In some embodiments, the Process Gateway is an internal security interface that a request must pass through in order to communicate with a given service. Gateways are used by the system to organize services so that the services stay modular. In some embodiments, a gateway (e.g., the process gateway) acts as a throttle point or an additional security boundary. In some embodiments, the gateways are "private" because they are not exposed to the internet and are only accessible once you get past the system's public gateway.

Figure 12:
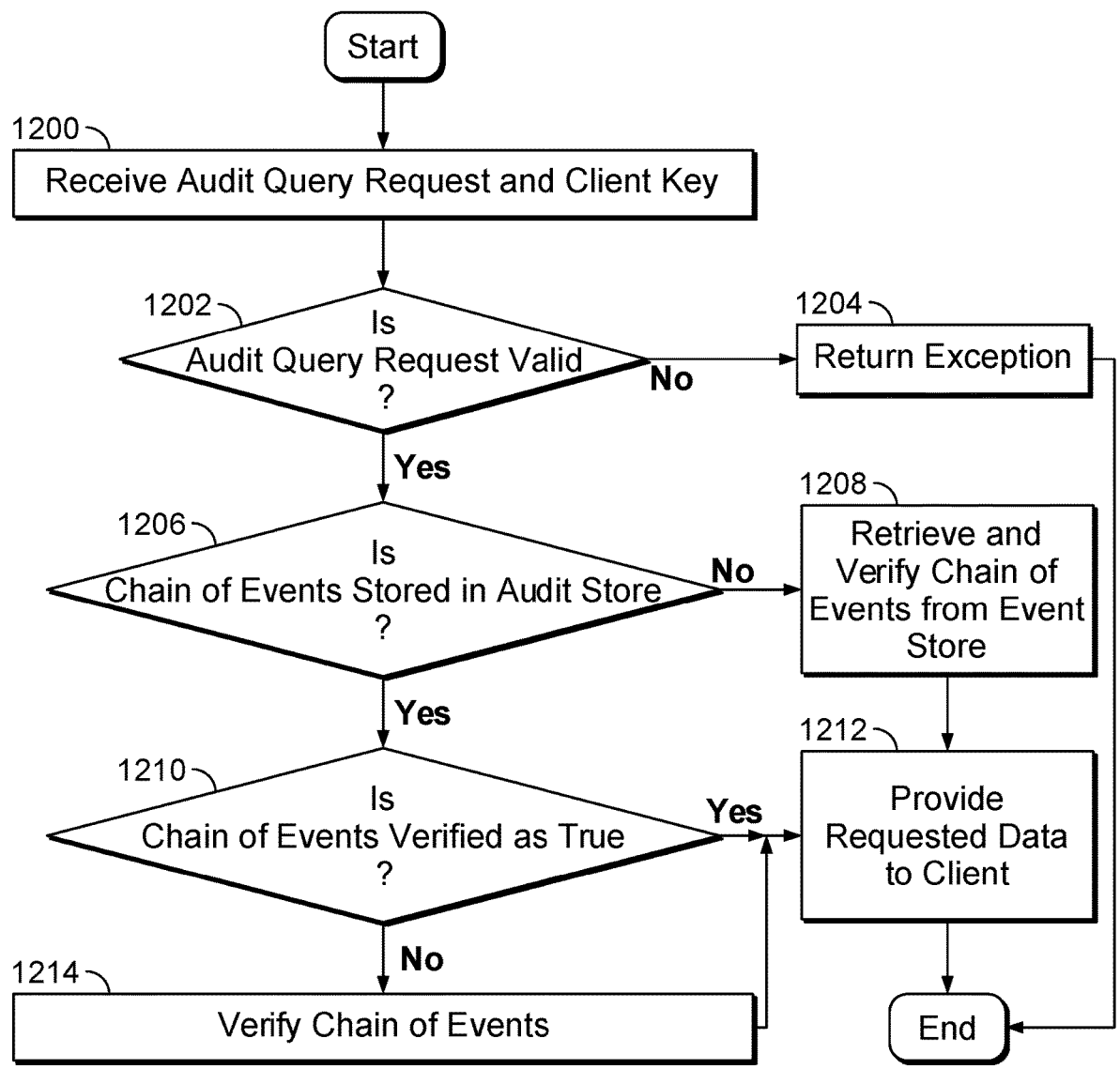
FIG. 12 is a flow diagram illustrating an embodiment of a method for fulfilling an audit query request.

FIG. 12 is a flow diagram illustrating an embodiment of a method for fulfilling an audit query request. In some embodiments, the process of FIG. 12 is executed by the system of FIG. 10.

The Audit Process is used to access and deliver validated information contained in an Audit Store, and/or Event Store, as required to respond to the Audit Query Request.

The Audit Store comprises a database used to store events, aggregates of events, and/or other data related to the contents of the Audit Store. In various embodiments, other data related to the contents of the Audit Store comprises (i) a listing (e.g., a lookup table) of the Audit Store contents (e.g., as listed by Aggregate ID, Sequence Number, timestamp of entry, and/or any other appropriate type of content identifier), (ii) content status (e.g., active, inactive, valid, corrupt, etc.), and/or (iii) access records (e.g., an access record that identifies what data was accessed, by what user and when, or any other appropriate type of access information).

The Event Store comprises a database used to store events and/or other data related to the contents of the Event Store. In various embodiments, other data related to the contents of the Event Store comprises (i) a listing (e.g., a lookup table) of the Event Store contents (e.g., as listed by unique Sequence Number, or any other appropriate type of content identifier), (ii) content status (e.g., active, inactive, valid, corrupt, etc.), and/or (iii) access records (e.g., an access record that identifies what event data was accessed, by what user and when, or any other appropriate type of access information).

In some embodiments, the Audit Process comprises a service provider that enables auditors (e.g., human auditors, software audit programs, or any appropriate combination of human auditors and software audit programs) to inspect and audit the contents of the Audit Store (e.g., validating an event chain of an existing aggregate).

For example, the Audit Process is used to aggregate and validate a chain of N events prior to responding with the requested information. In some embodiments, a field added to each event of the chain of N events is used to indicate the verification status of each event (e.g., a "Verified: True" field). In some embodiments, a verification field at the aggregate-level indicates the verification status of the aggregate comprising the chain of N events. In the event that the requested information is indicated as previously verified, the Audit Process returns the requested information without further validation (e.g., by accessing and returning the requested information from the Audit Store.)

In the event that any of the requested information was not previously verified, (e.g., a verification field either does not exist or is empty, or by the presence of a "Verified: False" field), the Audit Process validates any unverified events using the Client Key prior to responding with the requested information (e.g., by validating each unverified event within an aggregate comprising a chain of N events). In the event that one or more requested events are not listed as available in the Audit Store, the Audit Process accesses and retrieves the requested information from the Event Store. In the event that one or more requested events are not available in either the Audit Store or the Event Store, the Audit Process returns an exception (e.g., by sending a message to the requestor and/or the curator of the Database System).

In the example shown, in 1200, an Audit Query Request and Client Key are received. For example, an Audit Query Request and Client Key are received by the Audit Process via a Request Handler and/or a Process Gateway.

In 1202, it is determined whether the Audit Query Request is valid. For example, the Audit Process determines whether the Audit Query Request is valid, wherein determining whether the request is valid comprises determining whether the request is valid syntactically and/or whether data included with the request is appropriate for the request including determining one or more of the following: whether the data is within range, whether the data is of appropriate data type, and/or whether the data matches the requested input parameters.

In response to the Audit Query Request failing to validate, control passes to 1204. In 1204, an Exception is returned, and the process ends. For example, the service provider is notified (e.g., via log, email, etc.) and an unsuccessful response is returned to the Client (e.g., a message stating that the Client Request failed to validate, and/or including an error code, or any other appropriate information).

In response to the Audit Query Request being validated, control passes to 1206. In 1206, it is determined whether the chain of events is stored in the Audit Store. For example, the data associated with the Audit Query Request is stored in the Audit Store. In response to determining that the chain of events is not stored in the Audit Store, control passes to 1206. In 1208, the chain of events is retrieved and stored from the Event Store, and control passes to 1212. For example, the data associated with the Audit Query Request is located, retrieved, verified, and/or aggregated from the Event Store by checking that the chain of events passes its signature checks. For example, verifying the chain comprises selecting an event, retrieving contents of an event, generating a hash value by hashing data and a sequence number of an event with an event signature from a prior event, encrypting the hash value using the client key to generate a check signature, and determining whether the check signature is equivalent to a next event signature. In some embodiments, the Audit Process retrieves the Requested Data using an Aggregate ID (e.g., a Sequence Number that uniquely identifies a particular aggregate) that is included in the Audit Query Request (e.g., as a header to one or more data blocks comprising the Audit Query Request). In response to determining that the chain of events is stored in the Audit Store in 1206, control passes to 1210.

In 1210, it is determined whether the chain of events is verified as true. In response to determining that the chain of events is verified as true, control passes to 1212.

In 1212, the requested data is provided to the client, and the process ends. For example, the data requested in the Audit Query Request is provided to the client (e.g., the user associated with the client request). In some embodiments, the Audit Process responds with an aggregate, and/or the state of the aggregate, comprising a validated chain of N events.

In response to determining that the chain of events is not verified as true, control passes to 1214. In 1214, the chain of events is verified, and control passes to 1212. For example, the chain of events stored in the Audit Store is verified by checking that the chain of events passes its signature checks. For example, verifying the chain comprises selecting an event, retrieving contents of an event, generating a hash value by hashing data and a sequence number of an event with an event signature from a prior event, encrypting the hash value using the client key to generate a check signature, and determining whether the check signature is equivalent to a next event signature.

In some embodiments, the Audit Process is used by the curator of the Database System to access other information related to the contents of the Audit Store (e.g., user access records, corrupt data, exception notifications, etc.). For example, the curator of the Database System may need to investigate causes of corrupt data, improper software operation, improper database access; to generate related reports; and/or access any other appropriate information required to maintain and support the Database System.

Figure 13A:
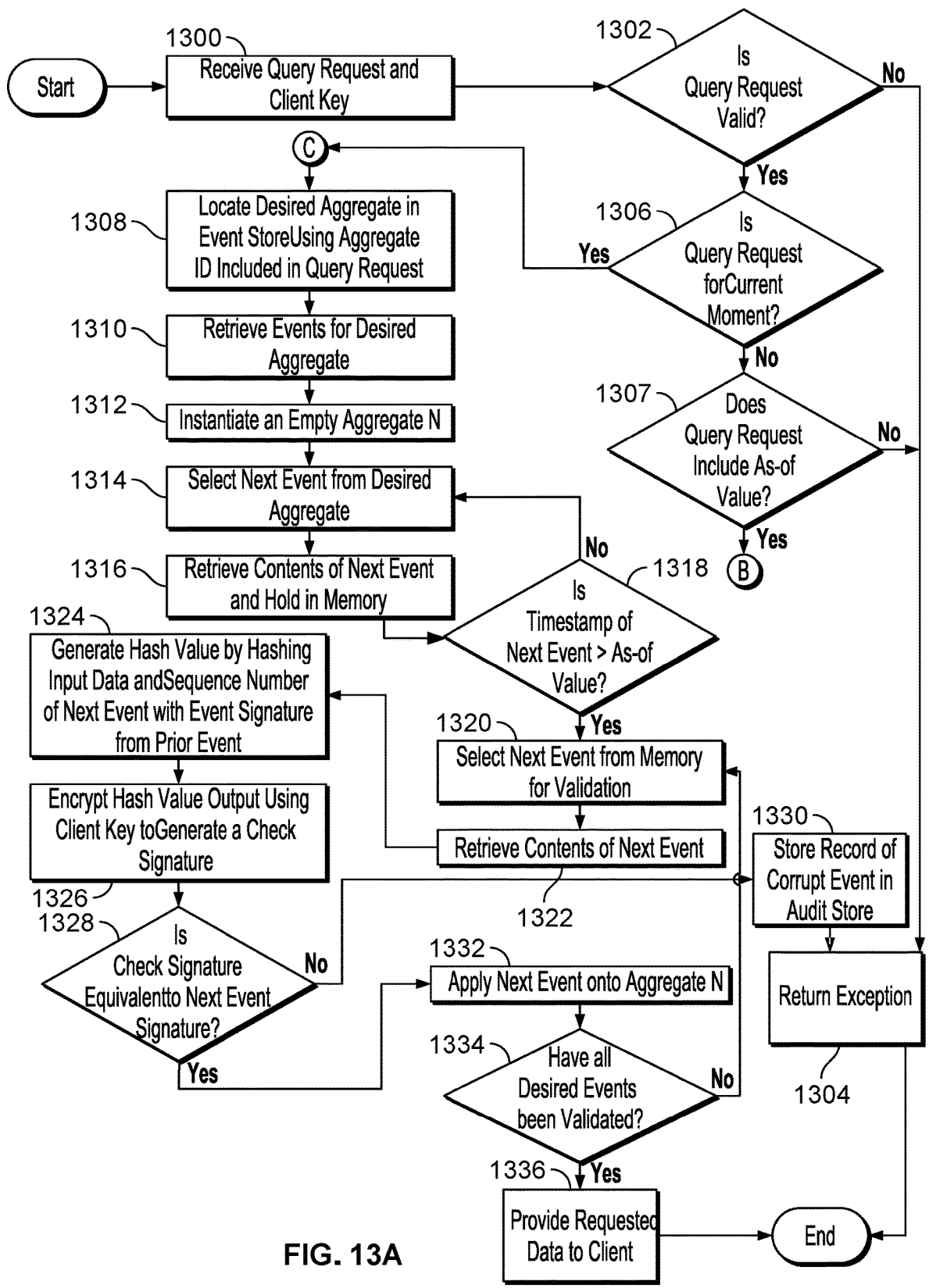
FIGS. 13A and 13B are a flow diagram illustrating an embodiment of a method for fulfilling a query request.
Figure 13B:
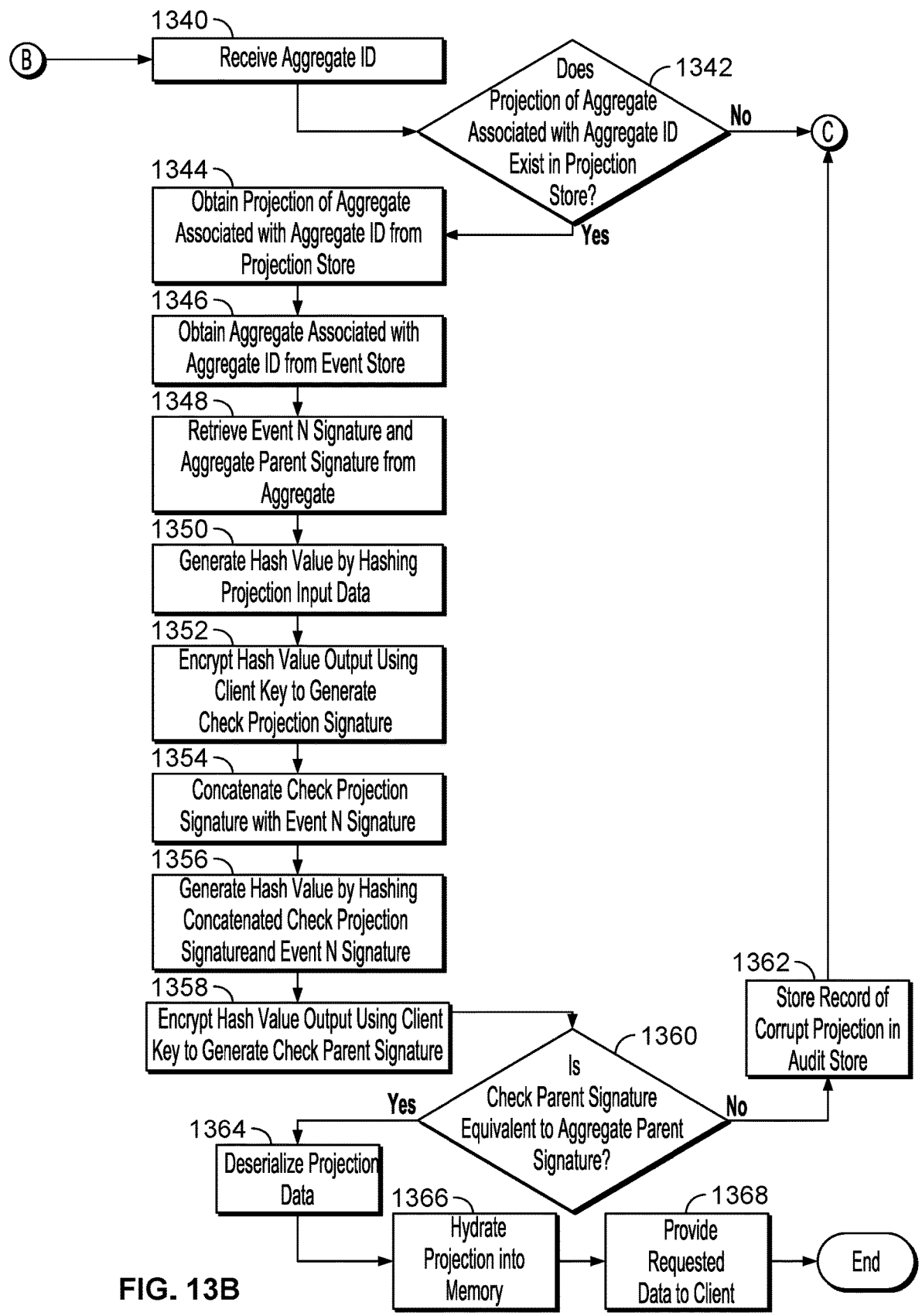

FIGS. 13A and 13B are a flow diagram illustrating an embodiment of a method for fulfilling a query request. In some embodiments, the process of FIGS. 13A and 13B are executed by the system of FIG. 10.

The Query Process is used to access and deliver validated information contained in an Event Store, and/or Projection Store, as required to respond to the Query Request.

The Event Store comprises a database used to store events and/or other data related to the contents of the Event Store. In various embodiments, other data related to the contents of the Event Store comprises (i) a listing (e.g., a lookup table) of the Event Store contents (e.g., as listed by unique Sequence Number, or any other appropriate type of content identifier), (ii) content status (e.g., active, inactive, valid, corrupt, etc.), and/or (iii) access records (e.g., an access record that identifies what event data was accessed, by what user and when, or any other appropriate type of access information).

The Projection Store comprises a database used to store, cache, and/or pre-compute current and/or frequently accessed forms of an aggregate useful for performance boosting. A projection is a copy of an aggregate's current state. In some embodiments, the projection includes incorporating modification and/or deletions as of an effective moment/date of an entry in the database system even if the entry is later in the entry log (e.g., the entry or actual date of the entry is after the effective moment/date).

For example, the Query Process is used to retrieve events, and/or the state of an aggregate comprising a chain of N events, at a particular date and time (i.e., an 'As-of' date) or as of the current moment. In some embodiments, the state of an aggregate comprising a chain of N events is stored in the Projection Store to provide an improved Client response time and reduced computational complexity and cost.

In the example shown, in 1300, a Query Request and Client Key are received. For example, a Query Request and Client Key are received by the Query Process via a Request Handler and/or a Process Gateway.

In 1302, it is determined whether the Query Request is valid. For example, the Query Process determines whether the Query Request is valid. In some embodiments, determining whether the request is valid comprises determining whether the request is valid syntactically and/or whether data included with the request is appropriate for the request including determining one or more of the following: whether the data is within range, whether the data is of appropriate data type, and/or whether the data matches the requested input parameters.

In response to the Query Request failing to validate, control passes to 1304. In 1304, an Exception is returned, and the process ends. For example, the service provider is notified (e.g., via log, email, etc.) and an unsuccessful response is returned to the Client (e.g., a message stating that the Query Request failed to validate, and/or including an error code, or any other appropriate information), and the process ends.

In response to the Query Request being valid, control passes to 1306. In 1306, it is determined whether the Query Request is for the Current Moment. For example, the Query Process determines whether the Query Request is for the Current Moment (e.g., via a field indicator in the Query Request that indicates the requested information is to be provided as of the time that the Query Request is processed by the Query Process). In response to the Query Request being for the Current Moment, the process flows to (C) in FIG. 13A. In response to Query Request not being for the Current Moment, the control passes to 1307.

In 1307, it is determined whether the Query Request includes an As-of Value. In various embodiments, determining whether the Query Request includes an As-of Value comprises determining whether an As-of field in the Client Request (e.g., incorporated into a header of one or more data blocks comprising the Query Request) is non-empty, and/or whether the As-of Value indicates a date/time outside the range of data stored in the Event Store, and/or Projection Store.

In response to the Query Request not including an As-of Value, the control passes to 1304. In 1304, an Exception is returned, and the process ends. For example, the service provider is notified (e.g., via log, email, etc.) and an unsuccessful response is returned to the Client (e.g., a message stating that the Query Request is invalid, and/or including an error code, or any other appropriate information), and the process ends. In response to the Query Request including an As-of Value, the process flows to (B) in FIG. 13B.

In the example shown, in response to the Query Request being for the Current Moment, the control passes to 1308.

In 1308, the Desired Aggregate is located in the Event Store using the Aggregate ID included in the Client Request. For example, the Query Process locates the requested Aggregate ID (e.g., a Sequence Number that uniquely identifies a particular aggregate) by examining a look-up table within the Event Store.

In 1310, the Events for the Desired Aggregate are retrieved. For example, the Query Process retrieves the Events for the Desired Aggregate from the Event Store.

In 1312, an Empty Aggregate N is instantiated. For example, the Query Process instantiates an Empty Aggregate N. In some embodiments, Empty Aggregate N is an object-oriented data structure. In some embodiments, the data structure comprises a format to receive one or more events.

In 1314, a Next Event is selected from the Desired Aggregate. For example, the Query Process selects the Next Event from the Desired Aggregate comprising a chain of N events.

In 1316, the Contents of the Next Event are retrieved and held in memory. For example, the Query Process retrieves the Contents of the Next Event from the Desired Aggregate and holds them in memory (e.g., computer memory associated with the Query Process processor or any appropriate memory allocated to the Database System).

In 1318, it is determined whether the timestamp of the Next Event is greater than the As-of Value. For example, the Query Process determines whether the timestamp of the Next Event is greater than the As-of Value. In response to the timestamp of the Next Event not being greater than the As-of Value, the process flows to 1314. In response to the timestamp of the Next Event being greater than the As-of Value, control passes to 1320.

In 1320, a Next Event is selected from Memory for validation. In 1322, the Contents of the Next Event are retrieved. For example, the contents of a Next Event such as input data, an identifier, a proposed event signature, and a prior event signature are retrieved. In 1324, a Hash Value is generated by hashing the Input Data and Sequence Number of the Next Event with the Event Signature from the Prior Event. For example, the Input Data and Sequence Number of the Next Event are hashed with the Event Signature from the Prior Event, wherein the prior event comprises the event immediately prior to the selected Next Event from the Events retrieved in 1310. In 1326, the Hash Value Output of 1324 is encrypted using the Client Key to generate a Check Signature.

In 1328, it is determined whether the Check Signature is equivalent to the Next Event Signature. In response to the Check Signature being determined invalid, control passes to 1330. In 1330, a record of the Corrupt Event is stored in the Audit Store. For example, an indication or status is associated with the Next Event indicating that the Next Event is not valid, an indication is sent or logged indicating that the Next Event is not valid, the system reverts the Event data in the Aggregate to a valid state prior to the invalid event, the system regenerates the Next Event using stored input data for the Next Event, or any other appropriate action following an invalid determination. In 1304, an exception is returned, and the process ends. For example, the service provider is notified (e.g., via log, email, etc.) and an unsuccessful response is returned to the Client (e.g., a message stating that the Client Request failed to validate, and/or including an error code, or any other appropriate information).

In response to the Check Signature being equivalent to the Next Event Signature, control passes to 1332. In 1332, the Next Event is applied onto Aggregate N. In 1334, it is determined whether all Desired Events have been validated (i.e., all the Events on the list of Events retrieved from the Desired Aggregate in 1310). In response to determining that all Desired Events have not been validated, the process flows to 1320 to select a Next Event from Memory for validation. In response to determining that all Desired Events have been validated, the control passes to 1336. For example, in response to all the Events retrieved from the Desired Aggregate in 1310 having been validated, the control passes to 1336. In 1336, the Requested Data is provided to the Client, and the process ends. For example, the Query Process responds with an aggregate of events, and/or the state of the aggregate, comprising a validated chain of N events as of a requested date and time.

In the example shown in FIG. 13B, in 1340, an Aggregate ID is received. For example, the Aggregate ID is received from a memory coupled to a processor. In 1342, it is determined whether a Projection of the Aggregate associated with the Aggregate ID exists in the Projection Store. In response to the Aggregate ID not existing in the Projection Store, control passes to (C) of FIG. 13A.

In response to the Aggregate ID existing in the Projection Store, control passes to 1344, and the Projection of the Aggregate associated with the Aggregate ID is obtained from the Projection Store. For example, a Projection of the Aggregate associated with the Aggregate ID is obtained for a requested date/time (i.e., the As-of Value).

In 1346, the Aggregate associated with the Aggregate ID is obtained from the Event Store. For example, an Aggregate comprising a chain of N events is obtained from the Event Store by the Query Process.

In 1348, the Event N Signature and Aggregate Parent Signature are retrieved from the Aggregate. For example, the signature from the $N^{th}$ event within the Aggregate comprising a chain of N events, and the parent signature of the Aggregate, are retrieved by the Query Process. A Parent Signature comprises an encrypted and hashed concatenation of a Projection Signature with the latest signature of an event from an aggregate comprising a chain of N events (i.e., the Event N Signature). In various embodiments, the concatenation process is indicated by a standard, unambiguous delimiter (e.g., a vertical bar '|', a '+' glyph, or any other appropriate delimiter). A Projection Signature comprises an encrypted hash value of the input data included in a Projection, wherein the hash value is encrypted using a Client Key.

In 1350, a Hash Value is generated by hashing the Projection Input Data. In some embodiments, the hash is salted with a random number to provide additional security against precomputation attacks, such as Rainbow Table attacks.

In 1352, the Hash Value Output is encrypted using the Client Key to generate a Check Projection Signature. In 1354, the Check Projection Signature is concatenated with the Event N Signature. In 1356, a Hash Value is generated by hashing the concatenated Check Projection Signature and Event N Signature. In 1358, the Hash Value Output is encrypted using the Client Key to generate a Check Parent Signature. In 1360, it is determined whether the Check Parent Signature is equivalent to the Aggregate Parent Signature.

In response to determining that the Check Parent Signature is not equivalent to the Aggregate Parent Signature, control passes to 1362, and a Record of the Corrupt Projection is stored in the Audit Store. For example, an indication or status is associated with the Projection indicating that the Projection is not valid, an indication is sent or logged indicating that the Projection is not valid, the system reverts the Projection to a valid state prior to the invalid event, the system is flagged for a manual control process for review prior to the Projection being reverted, the system regenerates the Projection using stored input data in the Event Store, or any other appropriate action following an invalid determination.

In response to determining that the Check Parent Signature is equivalent to the Aggregate Parent Signature, control passes to 1364, and the Projection Data is deserialized. Deserialization transforms the Projection Data to a representation of the object that is executable. A serialized object which was used for communication cannot be processed by a computer program. An unmarshalling interface (e.g., within the Query Process) takes the serialized object and transforms it into an executable form.

In 1366, the Projection is hydrated into memory. For example, the Projection is hydrated into computer memory associated with the Query Process processor or any appropriate memory allocated to the Database System, wherein hydration comprises the extraction of the deserialized Projection Data to populate the data into a data object for communication to the Client. In 1368, the Requested Data is provided to the Client, and the process ends.

Figure 14A:
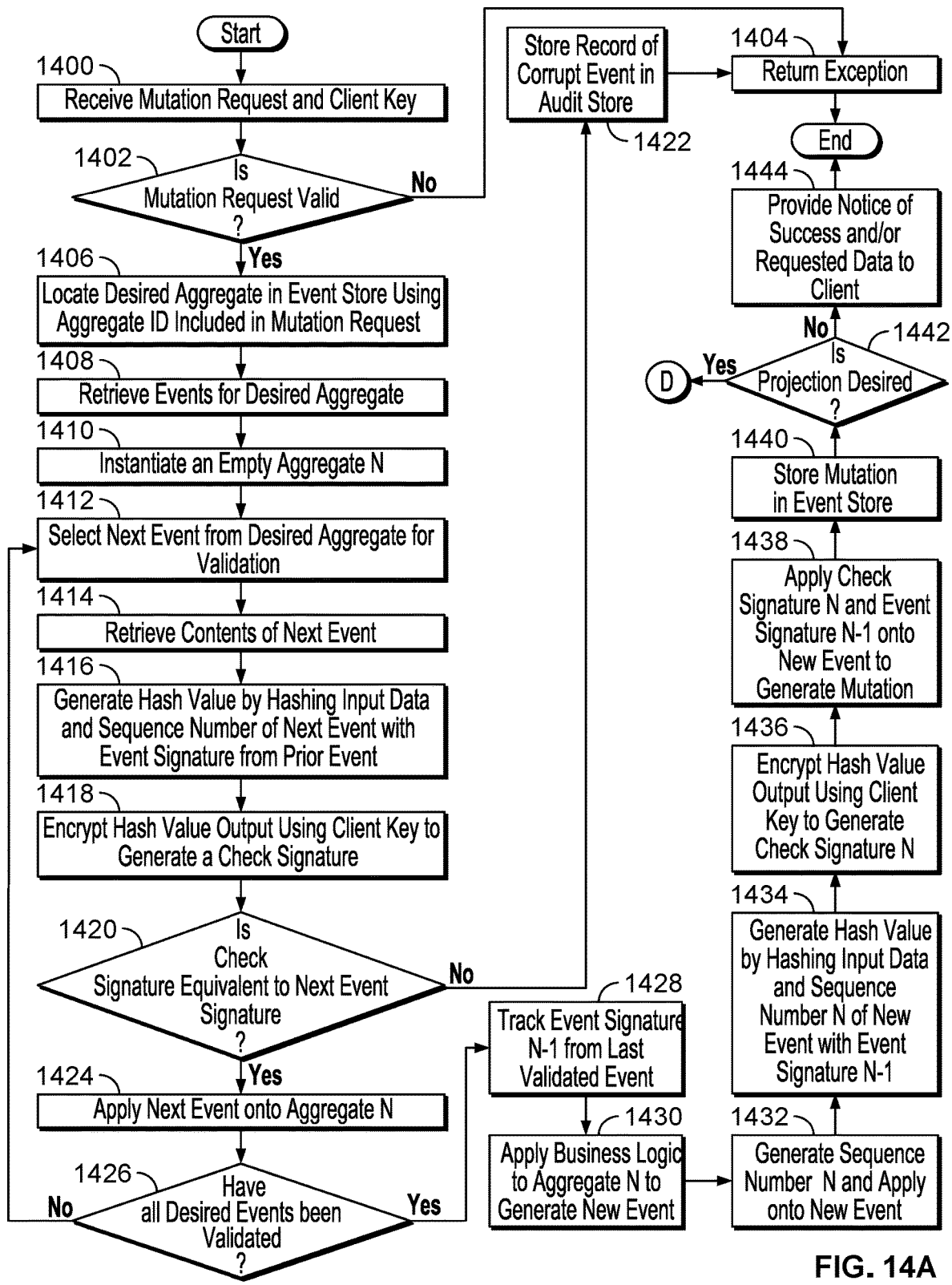
FIGS. 14A and 14B are flow diagrams illustrating an embodiment of a method for fulfilling a mutation request and writing a projection.
Figure 14B:
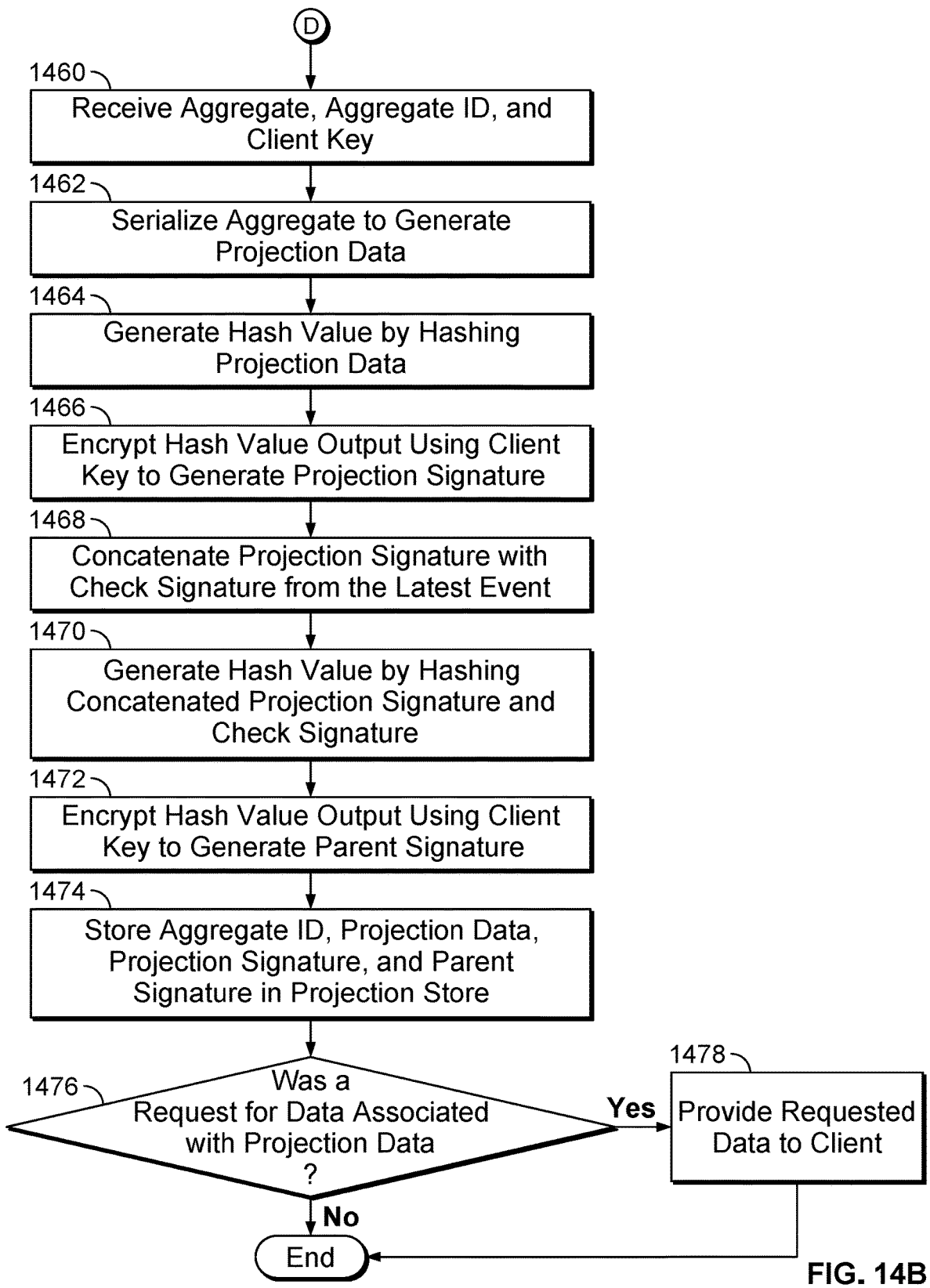

FIGS. 14A and 14B are flow diagrams illustrating an embodiment of a method for fulfilling a mutation request and writing a projection. In some embodiments, the process of FIGS. 14A and 14B are executed by the system of FIG. 10.

The Mutation Process is used to access, mutate, and deliver validated information contained in an Event Store, and/or Projection Store, as required to respond to the Mutation Request, wherein a mutation comprises persisting an event, appending an event to an existing aggregate, or assessing the impact of a different transaction on the aggregate's state. In some embodiments, the Mutation Process is used to generate and store a Projection.

The Event Store comprises a database used to store events and/or other data related to the contents of the Event Store. In various embodiments, other data related to the contents of the Event Store comprises (i) a listing (e.g., a lookup table) of the Event Store contents (e.g., as listed by unique Sequence Number, or any other appropriate type of content identifier), (ii) content status (e.g., active, inactive, valid, corrupt, etc.), and/or (iii) access records (e.g., an access record that identifies what event data was accessed, by what user and when, or any other appropriate type of access information).

The Projection Store comprises a database used to store, cache, and/or pre-compute current and/or frequently accessed forms of an aggregate useful for performance boosting. A projection is a copy of an aggregate's current state. In some embodiments, the projection includes incorporating modification and/or deletions as of an effective moment/date of an entry in the database system even if the entry is later in the entry log (e.g., the entry or actual date of the entry is after the effective moment/date).

In 1400, a Mutation Request and Client Key are received. For example, a Mutation Request and Client Key are received by the Mutation Process via a Request Handler and/or a Process Gateway.

In 1402, it is determined whether the Mutation Request is valid. For example, the Mutation Process determines whether the Mutation Request is valid. In some embodiments, determining whether the request is valid comprises determining whether the request is valid syntactically and/or whether data included with the request is appropriate for the request including determining one or more of the following: whether the data is within range, whether the data is of appropriate data type, and/or whether the data matches the requested input parameters.

In response to the Mutation Request failing to validate, control passes to 1404. In 1404, an Exception is returned, and the process ends. For example, the service provider is notified (e.g., via log, email, etc.) and an unsuccessful response is returned to the Client (e.g., a message stating that the Mutation Request failed to validate, and/or including an error code, or any other appropriate information).

In response to the Mutation Request being valid, control passes to 1406. In 1406, the Desired Aggregate is located within the Event Store using the Aggregate ID included in the Mutation Request. For example, the Mutation Process locates the Desired Aggregate using an Aggregate ID (e.g., a Sequence Number that uniquely identifies a particular aggregate) by examining a look-up table within the Event Store.

In 1408, the Events for the Desired Aggregate are retrieved. For example, the Mutation Process retrieves the Events for the Desired Aggregate from the Event Store.

In 1410, an Empty Aggregate N is instantiated. For example, the Mutation Process instantiates an Empty Aggregate N. In some embodiments, Empty Aggregate N is an object-oriented data structure. In some embodiments, the data structure comprises a format to receive one or more events.

In 1412, a Next Event is selected from the Desired Aggregate for validation. In 1414, the Contents of the Next Event are retrieved. For example, the contents of a Next Event such as input data, an identifier, a proposed event signature, and a prior event signature are retrieved. In 1416, a Hash Value is generated by hashing the Input Data and Sequence Number of the Next Event with the Event Signature from the Prior Event. For example, the Input Data and Sequence Number of the Next Event are hashed with the Event Signature from the Prior Event, wherein the prior event comprises the event immediately prior to the selected Next Event from the Events retrieved in 1408. In 1418, the Hash Value Output of 1416 is encrypted using the Client Key to generate a Check Signature.

In 1420, it is determined whether the Check Signature is equivalent to the Next Event Signature. In response to the Check Signature being determined invalid, control passes to 1422. In 1422, a record of the Corrupt Event is stored in the Audit Store. For example, an indication or status is associated with the Next Event indicating that the Next Event is not valid, an indication is sent or logged indicating that the Next Event is not valid, the system reverts the Event data in the Aggregate to a valid state prior to the invalid event, the system regenerates the Next Event using stored input data for the Next Event, or any other appropriate action following an invalid determination. In 1404, an exception is returned, and the process ends. For example, the service provider is notified (e.g., via log, email, etc.) and an unsuccessful response is returned to the Client (e.g., a message stating that the Mutation Request failed to validate, and/or including an error code, or any other appropriate information).

In response to the Check Signature being equivalent to the Next Event Signature, control passes to 1424. In 1424, the Next Event is applied onto Aggregate N. In 1426, it is determined whether all Desired Events have been validated (i.e., all the Events on the list of Events retrieved from the Desired Aggregate in 1310). In response to determining that all Desired Events have not been validated, the process flows to 1412 to select a Next Event from the Desired Aggregate for validation. In response to determining that all Desired Events have been validated, the control passes to 1428. For example, in response to all the Events retrieved from the Desired Aggregate in 1408 having been validated, the control passes to 1428. In 1428, Event Signature N-1 from the Last Validated Event is tracked. For example, the Event Signature N-1 is stored in processor memory.

In 1430, business logic is applied to Aggregate N to generate a New Event. For example, business logic comprises a logical algorithm (e.g. a client-specific API) used to create a new event or to modify a copy (e.g., a projection) of an existing event. An event is a data entry that represents a change in an application state (i.e., a mutation). In a financial system, examples of events include TradeOrderFilled, ClientNotified, AccountBalanceUpdated, or any other appropriate type of event. An application state does not change until a proposed mutation is 'persisted' into a database (e.g., stored in an event store).

In 1432, a Sequence Number N is generated and applied onto the New Event. For example, a Sequence Number N comprising an integer value representing the next logical sequence number for the New Event (e.g., based on the existing event sequence numbers within the Desired Aggregate) is applied onto the New Event.

In 1434, a Hash Value is generated by hashing Input Data and Sequence Number N of the New Event with Event Signature N-1. For example, the Input Data and Sequence N Number of the New Event are hashed with the Event Signature N-1 tracked in 1428. In 1436, the Hash Value Output of 1434 is encrypted using the Client Key to generate Check Signature N. In 1438, Check Signature N and Event Signature N-1 are applied onto the New Event to generate a Mutation. In 1440, the Mutation is stored in the Event Store.

In 1442, it is determined whether a Projection is desired. For example, it is determined whether a copy of the Mutation is desired to be created and stored in the Projection Store (e.g., for performance boosting by shortcutting the Aggregate-hydration process when only concerned with the latest state of the Aggregate).

In response to determining that a Projection is not desired, the control passes to 1444. In 1444, a Notice of Success and/or the Requested Data is provided to the Client, and the process ends. For example, the Mutation Process provides to the Client a confirmation that the New Event (i.e., the proposed Mutation) has been successfully stored in the Event Store, and/or provides to the Client a modified (i.e., mutated) aggregate of events, and/or the state of the modified aggregate, as based on the Mutation Request, and the process ends.

In response to determining that a Projection is desired, the control passes to (D) of FIG. 14B. In 1460, the Aggregate, Aggregate ID, and Client Key are received. For example, the Aggregate, Aggregate ID, and Client Key are received from processor memory for the process of fulfilling a mutation request as in FIG. 14A. In 1462, the Aggregate is serialized to generate Projection Data. For example, the Mutation Process serializes the Aggregate to a storage-writable format (e.g., binary, JSON, etc.) to generate Projection Data. In 1464, a Hash Value is generated by hashing the Projection Data. In 1466, the Hash Value Output is encrypted using the Client Key to generate a Projection Signature. In 1468, the Projection Signature is concatenated with the Check Signature from the Latest Event. For example, the Projection Signature is concatenated with the Check Signature from the $N^{th}$ Event of the Aggregate comprising a chain of N events received in 1460.

In 1470, a Hash Value is generated by hashing the Concatenated Projection Signature and Check Signature. In 1472, the Hash Value Output is encrypted using the Client Key to generate a Parent Signature. In 1474, the Aggregate ID, Projection Data, Projection Signature, and Parent Signature are stored in the Projection Store.

In 1476, it is determined whether a Request for Data was associated with the Projection Data. For example, the Mutation Request of 1400 may have requested simply to mutate and persist a new event to an existing aggregate without requiring more than notice of success. In response to determining that a Request for Data was not associated with the Projection Data, the process ends.

In response to determining that a Request for Data was associated with the Projection Data, the control passes to 1478. In 1478, the Requested Data is provided to the Client, and the process ends. For example, the Mutation Process responds with a mutated aggregate of events, and/or the state of the mutated aggregate (e.g., comprising a validated chain of one or more mutated events), and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for auditing event data, comprising:
an interface configured to:
  receive an audit query request and a client key; and
a hardware processor configured to:
  determine that the audit query request is valid;
  determine whether a chain of events is stored in an audit store, wherein the chain of events is associated with the audit query request; and
  in response to determining that the chain of events is stored in the audit store, retrieve from the audit store data for verifying the chain of events, wherein the data for verifying the chain of events comprises contents of a prior event and a next event of the chain of events, wherein the prior event is immediately prior to the next event in the chain of events; and
  verify the next event, comprising to:
    select the next event for validation;
    retrieve input data for the next event, a sequence number for the next event, a next event signature for the next event, and a prior event signature for the prior event;
    generate a hash value by hashing the input data, the sequence number, and the prior event signature;
    encrypt the hash value using the client key to generate a check signature for the next event;
    determine whether the check signature is equivalent to the next event signature; and
    in response to determining that the check signature is equivalent to the next event signature, indicate that the next event is verified.

2. The system of claim 1, further comprising determining whether the chain of events is verified as true, and in response to determining that the chain of events is verified as true, providing requested data for the audit query request.

3. The system of claim 2, wherein in response to determining that the chain of events is not verified as true, verifying the chain of events.

4. The system of claim 1, wherein in response to determining that the chain of events is not stored in the audit store, retrieving from an event store the data for verifying the chain of events.

5. A method for auditing event data, comprising:
receiving an audit query request and a client key; and
determining, using a processor, that the audit query request is valid;
determining whether a chain of events is stored in an audit store, wherein the chain of events is associated with the audit query request;
in response to determining that the chain of events is stored in the audit store, retrieving from the audit store data for verifying the chain of events, wherein the data for verifying the chain of events comprises contents of a prior event and a next event of the chain of events, wherein the prior event is immediately prior to the next event in the chain of events; and
verifying the next event, comprising:
  selecting the next event for validation;
  retrieving input data for the next event, a sequence number for the next event, a next event signature for the next event, and a prior event signature for the prior event;
  generating a hash value by hashing the input data, the sequence number, and the prior event signature;
  encrypting the hash value using the client key to generate a check signature for the next event;
  determining whether the check signature is equivalent to the next event signature; and
  in response to determining that the check signature is equivalent to the next event signature, indicating that the next event is verified.

6. A computer program product for auditing event data, the computer program product being embodied in a non-transitory computer readable storage medium and comprising computer instructions for:
receiving an audit query request and a client key; and
determining, using a processor, that the audit query request is valid;
determining whether a chain of events is stored in an audit store, wherein the chain of events is associated with the audit query request;
in response to determining that the chain of events is stored in the audit store, retrieving from the audit store data for verifying the chain of events, wherein the data for verifying the chain of events comprises contents of a prior event and a next event of the chain of events, wherein the prior event is immediately prior to the next event in the chain of events; and
verifying the next event, comprising:
  selecting the next event for validation;
  retrieving input data for the next event, a sequence number for the next event, a next event signature for the next event, and a prior event signature for the prior event;
  generating a hash value by hashing the input data the sequence number and the prior event signature;
  encrypting the hash value using the client key to generate a check signature for the next event;
  determining whether the check signature is equivalent to the next event signature; and
  in response to determining that the check signature is equivalent to the next event signature, indicating that the next event is verified.

\* \* \* \* \*